United States Patent
Nakamura et al.

(10) Patent No.: US 8,190,813 B2
(45) Date of Patent: May 29, 2012

(54) TERMINAL APPARATUS WITH RESTRICTED NON-VOLATILE STORAGE MEDIUM

(75) Inventors: Yousuke Nakamura, Kawasaki (JP); Kazuaki Nimura, Kawasaki (JP); Fumio Honda, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 12/605,502

(22) Filed: Oct. 26, 2009

(65) Prior Publication Data
US 2010/0169554 A1   Jul. 1, 2010

(30) Foreign Application Priority Data
Dec. 25, 2008 (JP) ................................. 2008-331497

(51) Int. Cl.
*G06F 12/00* (2006.01)
(52) U.S. Cl. ......... 711/103; 711/167; 711/170; 711/173
(58) Field of Classification Search ........................ None
See application file for complete search history.

(56) References Cited

U.S. PATENT DOCUMENTS
6,564,286 B2 * 5/2003 DaCosta .................. 711/103
2005/0188278 A1 * 8/2005 Zimmer et al. ............ 714/42

FOREIGN PATENT DOCUMENTS
JP   2004-208184   7/2004

* cited by examiner

*Primary Examiner* — Shawn X Gu
(74) *Attorney, Agent, or Firm* — Staas & Halsey LLP

(57) ABSTRACT

A terminal apparatus acquires setting information for controlling whether a storage area held by the non-volatile storage medium is to be used or not, from an external apparatus connected via a network, when the terminal apparatus is activated. The terminal apparatus updates area definition information defining the structure of storage areas in the non-volatile storage medium so that the storage area the use of which is restricted is in a state which cannot be recognized by the operating system, if the acquired setting information indicates that the use of the storage area is restricted. The terminal apparatus performs activation processing of the operating system after the update processing of the area definition information ends, if the acquired setting information indicates that the use of the storage area is restricted.

8 Claims, 30 Drawing Sheets

FIG. 6

| T1001 SPECIFICATION OF ACTIVITY |
|---|
| T1002 AREA CLASSIFICATION |
| T1003 ADDRESS INFORMATION |

FIG. 7

| T1801 BOOTSTRAP LOADER |
|---|
| T1802-1 PARTITION TABLE 1 |
| T1802-2 PARTITION TABLE 2 |
| T1802-3 PARTITION TABLE 3 |
| T1802-4 PARTITION TABLE 4 |
| T1803 BOOT SIGNATURE |

FIG. 8

| T18021 BOOT FLAG |
|---|
| T18022 STARTING POSITION (CHS ADDRESS) |
| T18023 PARTITION TYPE |
| T18024 ENDING POSITION (CHS ADDRESS) |
| T18025 STARTING POSITION (LBA ADDRESS) |
| T18026 TOTAL NUMBER OF SECTORS (LBA ADDRESS) |

FIG. 9

| T1501 THE NUMBER OF LIST ELEMENTS | | |
|---|---|---|
| T1502 AREA IDENTIFICATION INFORMATION | T1503 KEY DATA | T1504 DRIVE DISPLAY |
| ... | | |

FIG. 12

| T3011 DEVICE IDENTIFICATION INFORMATION | T3012 AREA INFORMATION | T3015 DEFINITION INFORMATION |
|---|---|---|

FIG. 13

| T3011 DEVICE IDENTIFICATION INFORMATION | T3012 AREA INFORMATION | | T3015 DEFINITION INFORMATION | |
|---|---|---|---|---|
| | T3013 AREA IDENTIFICATION INFORMATION | T3014 AREA CLASSIFICATION | T3016 DEFINITION CLASSIFICATION | T3017 DRIVE DISPLAY |
| 0001 | 1 | 07 | NORMAL | PERMITTED |
| 0001 | 1 | 07 | RESTRICTED | PERMITTED |
| 0001 | 2 | 07 | NORMAL | PERMITTED |
| 0001 | 2 | 07 | RESTRICTED | NOT PERMITTED |
| 0001 | 3 | 07 | NORMAL | PERMITTED |
| 0001 | 3 | 07 | RESTRICTED | NOT PERMITTED |
| 0001 | 4 | 00 | NORMAL | — |
| 0001 | 4 | 00 | RESTRICTED | — |

| T3021 DEVICE IDENTIFICATION INFORMATION | T3022 AREA IDENTIFICATION INFORMATION | T3023 KEY DATA |
|---|---|---|
| | | |

FIG. 15

| T3031 DEVICE IDENTIFICATION INFORMATION | T3032 STATE INFORMATION |
|---|---|
| 0001 | NORMAL |
| 0002 | RESTRICTED |

FIG. 16

| T3041 AREA IDENTIFICATION INFORMATION | T3042 DRIVE DISPLAY |
|---|---|
| 1 | PERMITTED |
| 2 | PERMITTED |
| 3 | PERMITTED |
| 4 | — |

FIG. 20

| T3011 | T3018 | T3012 AREA INFORMATION | | T3015 DEFINITION INFORMATION | |
|---|---|---|---|---|---|
| DEVICE IDENTIFICATION INFORMATION | MEDIUM IDENTIFICATION INFORMATION | T3013 AREA IDENTIFICATION INFORMATION | T3014 AREA CLASSIFICATION | T3016 DEFINITION CLASSIFICATION | T3017 DRIVE DISPLAY |
| 0001 | 0001 | 1 | 07 | NORMAL | PERMITTED |
| 0001 | 0001 | 1 | 07 | RESTRICTED | PERMITTED |
| 0001 | 0001 | 2 | 07 | NORMAL | PERMITTED |
| 0001 | 0001 | 2 | 07 | RESTRICTED | NOT PERMITTED |
| 0001 | 0001 | 3 | 07 | NORMAL | PERMITTED |
| 0001 | 0001 | 3 | 07 | RESTRICTED | NOT PERMITTED |
| 0001 | 0001 | 4 | 00 | NORMAL | — |
| 0001 | 0001 | 4 | 00 | RESTRICTED | — |
| 0001 | 0002 | 1 | 07 | NORMAL | PERMITTED |
| 0001 | 0002 | 1 | 07 | RESTRICTED | NOT PERMITTED |
| 0001 | 0002 | 2 | 07 | NORMAL | PERMITTED |
| 0001 | 0002 | 2 | 07 | RESTRICTED | NOT PERMITTED |
| 0001 | 0002 | 3 | 07 | NORMAL | PERMITTED |
| 0001 | 0002 | 3 | 07 | RESTRICTED | NOT PERMITTED |
| 0001 | 0002 | 4 | 00 | NORMAL | — |
| 0001 | 0002 | 4 | 00 | RESTRICTED | — |

FIG. 21

| T3021 DEVICE IDENTIFICATION INFORMATION | T3024 MEDIUM IDENTIFICATION INFORMATION | T3022 AREA IDENTIFICATION INFORMATION | T3023 KEY DATA |
|---|---|---|---|

FIG. 22

| T3031 DEVICE IDENTIFICATION INFORMATION | T3033 MEDIUM IDENTIFICATION INFORMATION | T3032 STATE INFORMATION |
|---|---|---|
| 0001 | 0001 | NORMAL |
| 0002 | 0002 | RESTRICTED |

FIG. 24

| T3011 DEVICE IDENTIFICATION INFORMATION | T3012 AREA INFORMATION | | T3015 DEFINITION INFORMATION | | |
|---|---|---|---|---|---|
| | T3013 AREA IDENTIFICATION INFORMATION | T3014 AREA CLASSIFICATION | T3016 DEFINITION CLASSIFICATION | T3017 DRIVE DISPLAY | T3018 DATA ERASURE |
| 0001 | 1 | 07 | NORMAL | PERMITTED | NOT TO BE EXECUTED |
| 0001 | 1 | 07 | RESTRICTED | PERMITTED | NOT TO BE EXECUTED |
| 0001 | 2 | 07 | NORMAL | PERMITTED | NOT TO BE EXECUTED |
| 0001 | 2 | 07 | RESTRICTED | NOT PERMITTED | NOT TO BE EXECUTED |
| 0001 | 3 | 07 | NORMAL | PERMITTED | NOT TO BE EXECUTED |
| 0001 | 3 | 07 | RESTRICTED | NOT PERMITTED | TO BE EXECUTED |
| 0001 | 4 | 00 | — | — | — |
| 0001 | 4 | 00 | RESTRICTED | — | — |

FIG. 25

| T3041 AREA IDENTIFICATION INFORMATION | T3042 DRIVE DISPLAY | T3043 DATA ERASURE |
|---|---|---|
| 1 | PERMITTED | NOT TO BE EXECUTED |
| 2 | NOT PERMITTED | NOT TO BE EXECUTED |
| 3 | NOT PERMITTED | TO BE EXECUTED |
| 4 | — | — |

FIG. 28

| T1901 | T1902 |
|---|---|
| STARTING POSITION (LBA ADDRESS) | TOTAL NUMBER OF SECTORS (LBA ADDRESS) |

FIG. 32

| T2001 DEVICE IDENTIFICATION INFORMATION ||
|---|---|
| T2002 THE NUMBER OF LIST ELEMENTS ||
| T2003 AREA IDENTIFICATION INFORMATION | T2004 AREA CLASSIFICATION |
| . . . ||

FIG. 34

| T3012 AREA INFORMATION | | T3015 DEFINITION INFORMATION | | |
|---|---|---|---|---|
| T3013 AREA IDENTIFICATION INFORMATION | T3014 AREA CLASSIFICATION | T3016 DEFINITION CLASSIFICATION | T3017 DRIVE DISPLAY | |
| 1 | 07 | NORMAL | PERMITTED | 13-1 |
| 1 | 07 | RESTRICTED | PERMITTED | |
| 2 | 07 | NORMAL | PERMITTED | 13-2 |
| 2 | 07 | RESTRICTED | NOT PERMITTED | |
| 3 | 07 | NORMAL | PERMITTED | 13-3 |
| 3 | 07 | RESTRICTED | NOT PERMITTED | |
| 4 | 00 | NORMAL | — | |
| 4 | 00 | RESTRICTED | — | |

TERMINAL APPARATUS WITH RESTRICTED NON-VOLATILE STORAGE MEDIUM

CROSS-REFERENCE TO RELATED APPLICATIONS

This application claims the benefit of priority from Japanese Patent Application No. 2008-331497 filed on Dec. 25, 2008, which is herein incorporated by reference in its entirety.

BACKGROUND

1. Field

The present invention relates to a technique for suppressing leakage of information stored in a non-volatile storage medium utilized with the use of electronic equipment.

2. Description of the Related Art

Conventionally, it has been a problem that secret information stored in electronic equipment is leaked.

For example, there is a possibility that secret information, such as personal information stored in a non-volatile storage medium provided for a mobile phone or a personal computer, is leaked and wrongly used if the mobile phone or the personal computer is stolen.

Accordingly, there is proposed a system in which information stored in electronic equipment is encrypted. Only information required for use, among the information stored in the electronic equipment, is decrypted with the use of an encryption key acquired from a server apparatus connected via a network.

Japanese Patent Laid-Open No. 2004-208184 discloses a secret key management apparatus. The secret key management apparatus manages a secret key used for a public key cryptosystem for performing encryption using a public key and performing decryption with a secret key. The secret key management apparatus includes a secret key storage means for storing a secret key used by an external terminal capable of connecting to the secret key management apparatus via a network in association with information about a user of the external terminal (user information). The secret key management apparatus includes a user-specific information storage means for storing information specific to the user of the external terminal (user-specific information) in association with the user information. The secret key management apparatus includes a user-specific information checking means for checking user-specific information received from an external terminal which requests acquisition of a secret key against the user-specific information stored in the user-specific information storage means. The secret key management apparatus includes a secret key extraction means for, as a result of the checking by the user-specific information checking means, extracting, on the basis of user information corresponding to matched user-specific information, a secret key corresponding to the user information from the secret key storage means.

Thereby, as a result of the checking by the user-specific information checking means, the secret key extraction means extracts a secret key corresponding to the user information about the user only when the user-specific information agrees with the user-specific information stored in the user-specific information storage means.

Therefore, only a user whose identity is authenticated with the use of user-specific information can acquire his or her own secret key.

As a result, a secret key management apparatus can be provided which is capable of safely keeping a user's secret key, preventing a third person from stealing the secret key and which makes it possible to easily take out the secret key.

SUMMARY

According to one aspect of embodiments described bellow, a terminal apparatus is capable of accessing a non-volatile storage medium using an operating system. The terminal apparatus acquires setting information for controlling whether a storage area held by the non-volatile storage medium is to be used or not, from an external apparatus connected via a network, when the terminal apparatus is activated. The terminal apparatus updates area definition information defining the structure of storage areas in the non-volatile storage medium so that the storage area, the use of which is restricted, is in a state which cannot be recognized by the operating system if the acquired setting information indicates that the use of the storage area is restricted. The terminal apparatus performs activation processing of the operating system after the update processing of the area definition information ends if the acquired setting information indicates that the use of the storage area is restricted.

The above-described embodiments of the present invention are intended as examples, and all embodiments of the present invention are not limited to including the features described above.

BRIEF DESCRIPTION OF THE DRAWINGS

FIG. 6 is a diagram illustrating the data structure of area definition information;

FIG. 7 is a diagram illustrating an implementation example of an activation program and the area definition information;

FIG. 8 is a diagram illustrating the data structure of a partition table;

FIG. 9 is a diagram illustrating the data structure of setting information;

FIG. 12 is a diagram illustrating the data structure of a management policy DB;

FIG. 13 is a diagram illustrating an example of the contents of the management policy DB;

FIG. 14 is a diagram illustrating the data structure of a key management DB;

FIG. 15 is a diagram illustrating the data structure of a terminal information DB and an example of the contents thereof;

FIG. 16 is a diagram illustrating an example of the contents of policy information;

FIG. 20 is a diagram illustrating an example of the contents of the management policy DB (2);

FIG. 21 is a diagram illustrating the data structure of the key management DB (2);

FIG. 22 is a diagram illustrating the data structure of the terminal information DB and an example of the contents thereof (2);

FIG. 24 is a diagram illustrating an example of the contents of a management policy DB according to the second embodiment;

FIG. 25 is a diagram illustrating an example of the contents of policy information according to the second embodiment;

FIG. 28 is a diagram illustrating the data structure of an erasure request;

FIG. 32 is a diagram illustrating the data structure of an update request;

FIG. 34 is a diagram illustrating the data structure of a management policy DB according to the fourth embodiment and an example of the contents thereof;

DETAILED DESCRIPTION OF THE PREFERRED EMBODIMENTS

Figure 1:
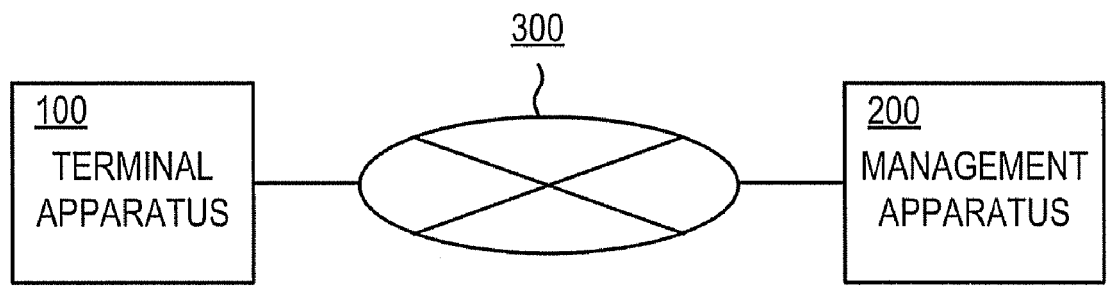
FIG. 1 is a diagram illustrating the configuration of a system.

Reference may now be made in detail to embodiments of the present invention, examples of which are illustrated in the accompanying drawings, wherein like reference numerals refer to like elements throughout.

Information management using encryption technology has a technical problem that, even if key data required for decryption is under close supervision, there is still a possibility that encrypted information may be decrypted.

Even if secret information is encrypted, there is still a possibility of leakage of the information. Therefore, it is a heavy burden for a person who manages secret information to take countermeasures against information leakage.

Getting an idea that it is important to prevent a third person from noticing the existence of secret information stored in electronic equipment, in the situation where the performance of electronic equipment is being improved, the inventor and others disclose the embodiments described below.

The embodiments disclosed below provide a technique capable of making it difficult for an operator to notice the existence of information stored in a non-volatile storage medium, on the basis of setting information received from an external apparatus.

According to the terminal apparatus disclosed below, area definition information about a non-volatile storage medium is updated on the basis of setting information acquired from an external apparatus connected via a network before activation processing of an operating system is executed.

That is, it is possible to control whether or not to enable a storage area held by the non-volatile storage medium to be used, on the basis of the setting information registered with the external apparatus.

As a result, it is possible to make it difficult for an operator of the terminal apparatus to notice data stored in the storage area which has been updated into a state in which the operating system cannot recognize it.

Furthermore, it is possible to make it difficult for a third person to notice the data stored in the storage area of the non-volatile medium held by the lost terminal apparatus even if the terminal apparatus is lost, by having registered the setting information for updating the storage area into the state that the operating system cannot recognize it, with the external apparatus. Thus, it is expected that leakage of information can be effectively suppressed.

Now, preferable embodiments of the present invention will be described below in detail with reference to drawings.

First Embodiment

1. System Configuration

FIG. 1 illustrates the configuration of a system according to this embodiment.

The system illustrated in FIG. 1 has a terminal apparatus 100 and a management apparatus 200.

The terminal apparatus 100 and the management apparatus 200 can communicate with each other via a communication network 300 using a given protocol such as TCP/IP (Transmission Control Protocol/Internet Protocol) and UDP/IP (User Datagram Protocol/Internet Protocol).

The terminal apparatus 100 writes information into a non-volatile storage medium having one or more storages areas (for example, four storage areas) and reads the written information.

The terminal apparatus 100 acquires setting information for controlling whether or not to enable the storage area to be used, for example, for each of the storage areas held by the non-volatile storage medium from the management apparatus 200. The terminal apparatus 100 also acquires setting information for controlling whether or not to display the storage area in an available state from the management apparatus 200.

The terminal apparatus 100 controls, for example, whether or not to display the storage area in an available state, on the basis of the setting information acquired from the management apparatus 200 described above.

By causing the functions described above to operate in conjunction with one another, the terminal apparatus 100 can make it impossible for an operator of the terminal apparatus 100 to notice the existence of a given storage area held by the non-volatile storage area.

As a result, it is possible to make it difficult for a third person to notice the existence of secret information by storing the secret information in such a storage area.

Furthermore, the terminal apparatus 100 receives key data from the management apparatus 200 connected via the communication network 300. The key data is used for decryption processing performed when information which has been encrypted and stored is used.

The terminal apparatus 100 acquires the key data from the management apparatus 200, for example, when activation processing is executed.

The terminal apparatus 100 performs decryption processing of encrypted information which is stored in a hard disk device or the like with the use of the key data acquired from the management apparatus 200. The terminal apparatus 100 displays the decrypted information on a display section or executes processing on the basis of the decrypted information.

The management apparatus 200 manages the key data to be provided for the terminal apparatus 100, and controls the operation of the terminal apparatus 100.

For example, when the terminal apparatus 100 is lost, use of the non-volatile storage medium held by the terminal apparatus 100 is restricted by registering setting for preventing a given storage area held by the non-volatile storage medium of the terminal apparatus 100 from being displayed in an available state, with the management apparatus 200.

2. Hardware Configuration of Terminal Apparatus

Figure 2:
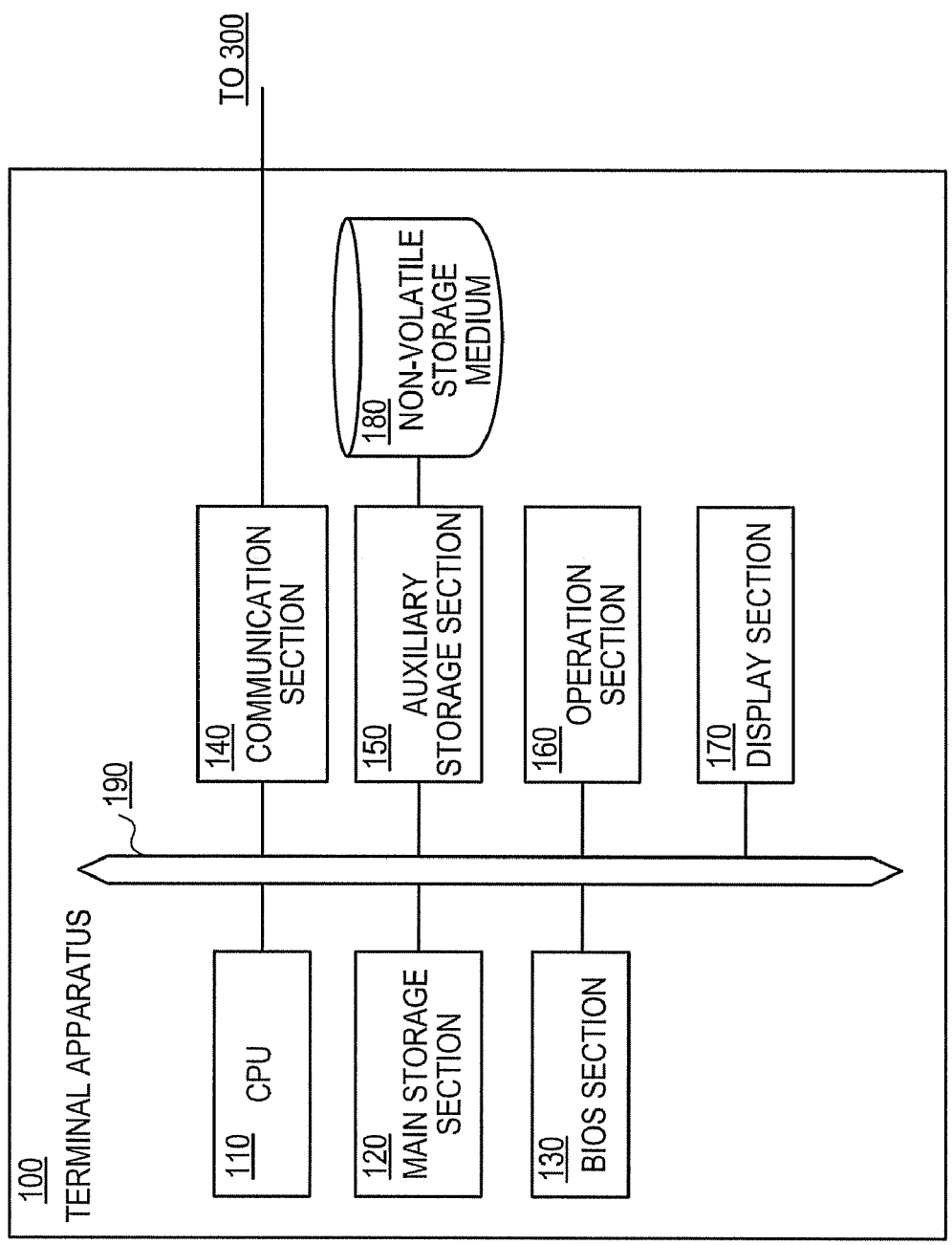
FIG. 2 is a diagram illustrating the hardware configuration of a terminal apparatus.

FIG. 2 illustrates the hardware configuration of the terminal apparatus 100.

The terminal apparatus 100 illustrated in FIG. 2 includes a CPU (Central Processing Unit) 110, a main storage section 120, a BIOS (Basic Input Output System) section 130, a communication section 140, an auxiliary storage section 150, an operation section 160, a display section 170, a non-volatile storage medium 180 and a communication line 190.

The CPU 110 is connected to each of the hardware sections of the terminal apparatus 100 via the communication line 190 and realizes a given function in accordance with a procedure for a program.

The CPU 110 includes, for example, an instruction register for temporarily storing an instruction read from the main storage section 120. The CPU 110 includes an instruction decoder for decoding a machine instruction (binary) stored in the instruction resistor and controlling each section held by the terminal apparatus 100 in accordance with the instruction. The CPU 110 includes an arithmetic logic unit for performing operation such as addition, subtraction and comparison of numerical values in accordance with control by the instruction decoder. The CPU 110 includes an accumulator for temporarily storing data targeted by the operation, the result of the operation or the like, and an address resistor for storing the address of a storage area held by the main storage section 120 where the CPU 110 performs reading or writing. The CPU 110 includes a program counter indicating the address of a storage held by the main storage section 120 in which an instruction to be executed next is stored, and the like.

The main storage section 120 is a unit that stores data generated by execution by the CPU 110 or data read from the auxiliary storage section 150.

For example, the main storage section 120 may be a semiconductor memory such as an SDRAM (Synchronous Dynamic Random Access Memory) and an SRAM (Static Random Access Memory).

The BIOS section 130 is a unit that stores a BIOS program which causes the CPU 110 to execute processing executed first when the terminal apparatus 100 is powered on, such as initialization processing of each of the hardware sections held by the terminal apparatus 100.

For example, the BIOS section 130 may be a non-volatile semiconductor memory, such as a flash memory and an EEPROM (Electrically Erasable Programmable Read Only Memory).

The communication section 140 is a unit that transmits and receives signals to and from the management apparatus 200 via the communication network 300, which may be wired or wireless.

The auxiliary storage section 150 is a unit that stores information into the non-volatile storage medium 180 in response to a write instruction received from the CPU 110. The auxiliary storage section 150 reads and outputs the information stored in the non-volatile storage medium 180 in response to a read instruction received from the CPU 110.

For example, the auxiliary storage section 150 may be a magnetic recording device such as an HDD (Hard Disk Drive) or a non-volatile semiconductor storage device such as an SSD (Solid State Disk).

The non-volatile storage medium 180 is, for example, a magnetic recording medium or a non-volatile semiconductor memory.

The non-volatile storage medium 180 may be stored inside the auxiliary storage section 150 or may be a portable non-volatile storage medium which is inserted from outside the terminal apparatus 100.

The operation section 160 is a unit that accepts a user operation and outputs to the CPU 110 a signal corresponding to the accepted user operation. Since the operation section 160 is connected to the CPU 110, the operation section 160 is capable of transmitting the signal to the CPU 110 via the communication line 190.

For example, the operation section 160 may be a keyboard, an indicating device such as a mouse and a touch pad, an input button and the like.

The display section 170 is a unit that causes a display device, such as a liquid crystal display device, to output information in accordance with a control instruction from the CPU 110.

The display device may be connected to the terminal apparatus 100 through a communication line held inside the terminal apparatus 100 and integrated with the terminal apparatus 100. The display device may also be connected to the terminal apparatus 100 through a 15 pin D-Sub (D-Subminiature) connector or the like.

3. Configuration of Program to be Executed by Terminal Apparatus

Figure 3:
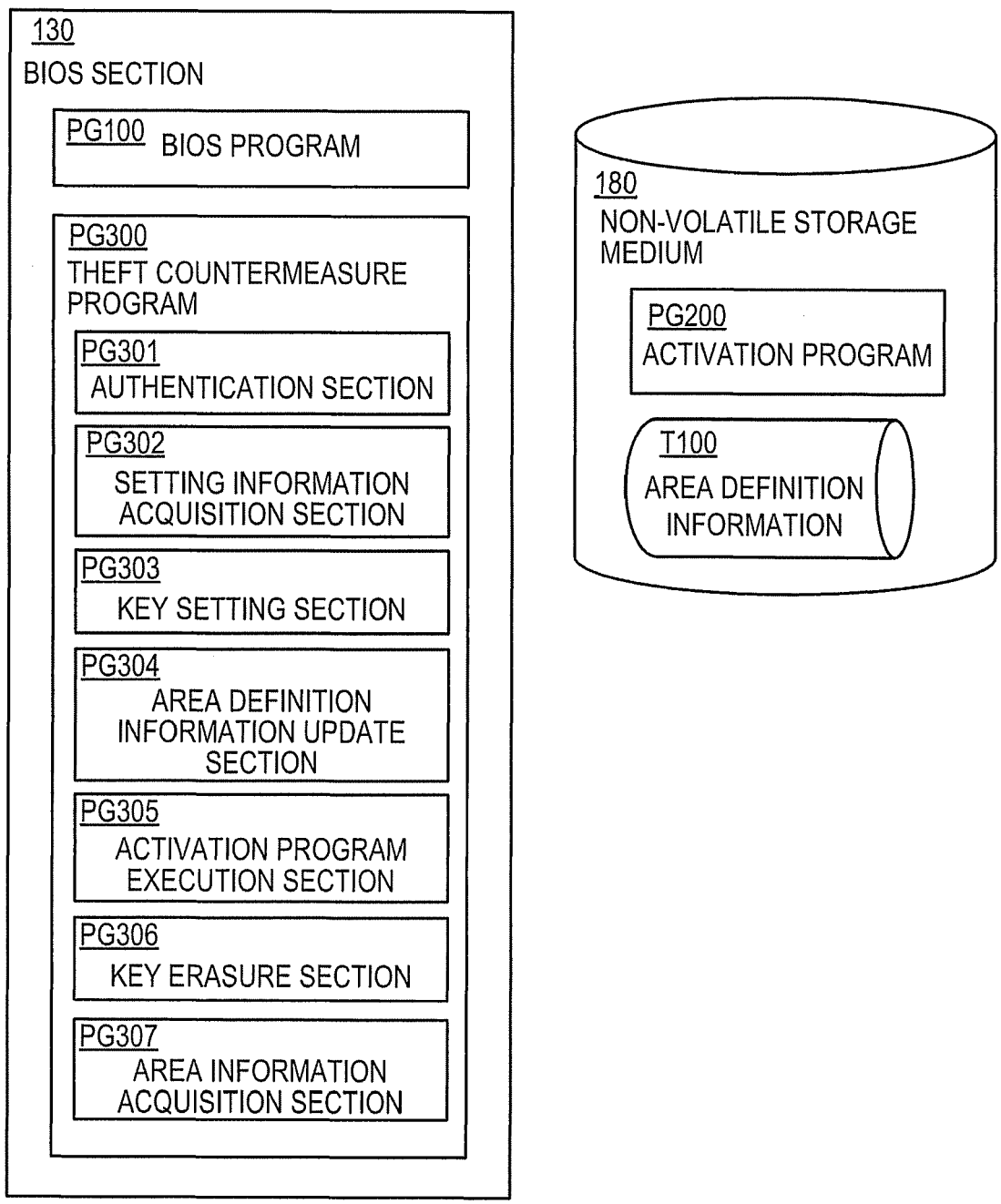
FIG. 3 is a diagram illustrating the configuration and storage place of a program to be executed by the terminal apparatus.

FIG. 3 illustrates the configuration and storage place of a program to be executed by the terminal apparatus 100.

The BIOS (Basic Input Output System) program PG100 illustrated in FIG. 3 is a software unit that causes the CPU 110 to operate as a component which initializes the hardware held by the terminal apparatus 100 and makes various settings when the terminal apparatus 100 is activated.

An activation program PG200 is illustrated in FIG. 3 The activation program PG200 is a software unit that causes the CPU 110 to operate as a component which activates the operating system stored in the non-volatile storage medium 180.

The activation program PG200 is also called, for example, a bootstrap loader or an OS loader (Operating System Loader).

A theft countermeasure program PG300 is illustrated in FIG. 3. The theft countermeasure program PG300 has an authentication section PG301, a setting information acquisition section PG302, a key setting section PG303, an area definition information update section PG304, an activation program execution section PG305, a key erasure section PG306 and an area information acquisition section PG307.

The authentication section PG301 is a software unit that causes the CPU 110 to operate as a component which judges whether or not the situation is such that processing by the theft countermeasure program PG300 may be continued.

The setting information acquisition section PG302 is a software unit that causes the CPU 110 to operate as a component which acquires setting information including definition information (T3015) registered with a management policy DB (T301) held by the management apparatus 200, from the management apparatus 200.

The key setting section PG303 is a software unit that causes the CPU 110 to operate as a component which sets key data acquired from a key management DB (T302) held by the management apparatus 200, in the auxiliary storage section 150.

The area definition information update section PG304 is a software unit that causes the CPU 110 to operate as a component which updates area definition information (T100) about the storage areas of the non-volatile storage medium 180 on the basis of the setting information acquired from the management apparatus 200.

The activation program execution section PG305 is a software unit that causes the CPU 110 to operate as a component which starts execution of the activation program for activating the operating system.

The key erasure section PG306 is a software unit that causes the CPU 110 to operate as a component which causes the key data set in the auxiliary storage section 150 to be erased.

The area information acquisition section PG307 is a software unit that causes the CPU 110 to operate as a component which acquires area information (T3012) registered with the management policy DB (T301) held by the management apparatus 200 from the management apparatus 200.

The theft countermeasure program PG300 illustrated in FIG. 3 is stored in the BIOS section 130 held by the terminal apparatus 100.

In the storage example illustrated in FIG. 3, the CPU 110 which executes the BIOS program PG100 reads the theft countermeasure program PG300 from the BIOS section 130, stores it into the main storage section 120, and then executes the theft countermeasure program PG300 stored in the main storage section 120.

With regard to the storage of the theft countermeasure program PG300 into the main storage section 120, the entire theft countermeasure program PG300 stored in the BIOS section 130 may be stored into the main storage section 120 as a whole, or only a necessary part may be read from the BIOS section 130 and stored into the main storage section 120 in accordance with the state of execution by the CPU 110.

In the example illustrated in FIG. 3, even if the non-volatile storage medium 180 held by the terminal apparatus 100 is replaced with a different non-volatile storage medium, the theft countermeasure program PG300 according to this embodiment can be executed on the terminal apparatus 100. That is, it is advantageous to prevent from abuse of the terminal apparatus 100 by unauthorized users.

Figure 4:
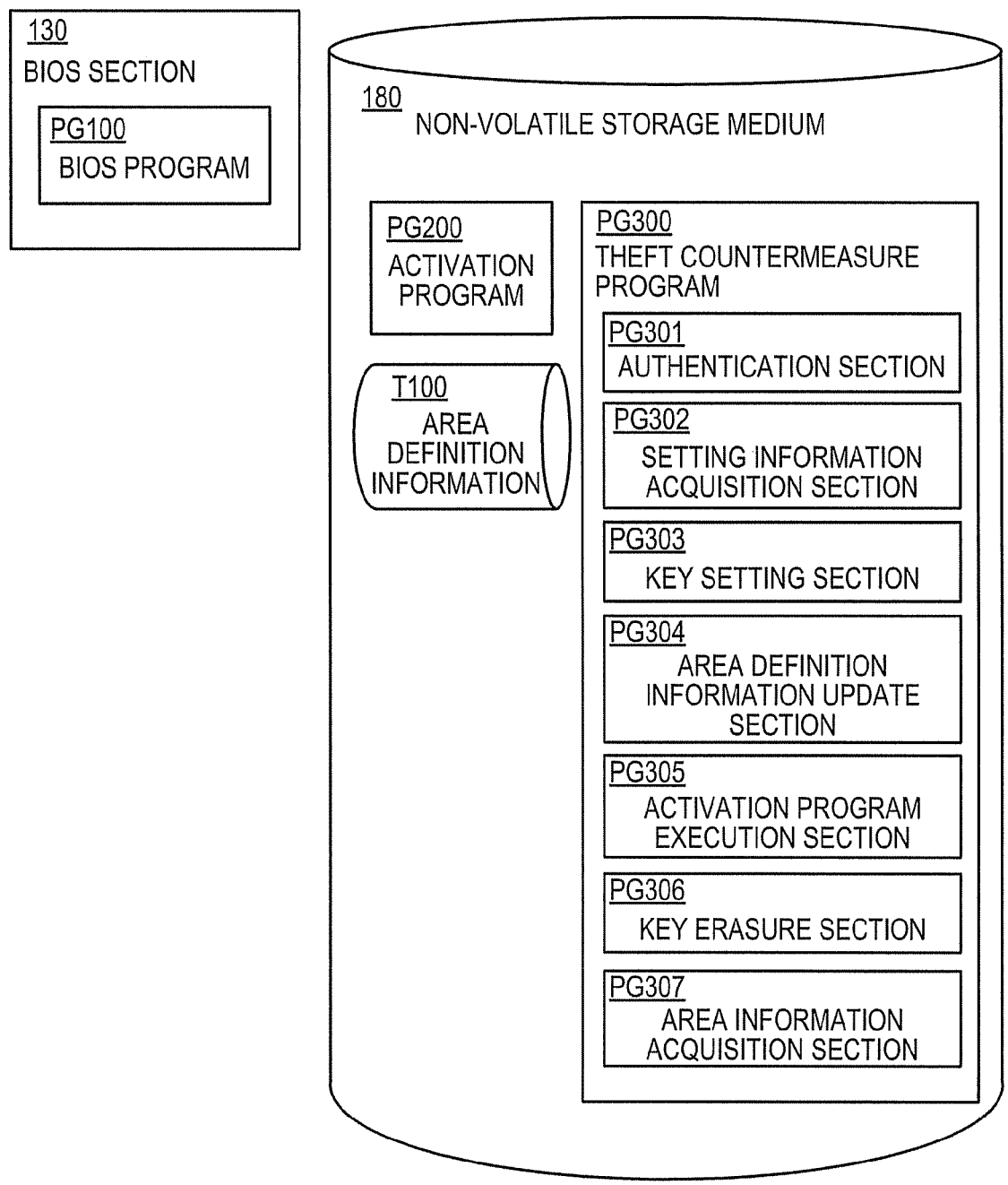
FIG. 4 is a diagram illustrating the configuration and storage place of a program to be executed by the terminal apparatus (2)

FIG. 4 illustrates an example where the theft countermeasure program PG300 is stored in the non-volatile storage medium 180.

In the storage example illustrated in FIG. 4, the CPU 110 (shown in FIG. 2) which executes the BIOS program PG100 reads the theft countermeasure program PG300 from the non-volatile storage medium 180 using the auxiliary storage section 150, stores it into the main storage section 120, and then executes the theft countermeasure program PG300 stored in the main storage section 120.

In this case, the auxiliary storage section 150 has a function of, if receiving a request to read information stored at the top address of the non-volatile storage medium 180 and the request is the first read request after power is on, changing the address targeted by reading to an address at which the theft countermeasure program PG300 is stored.

That is, the auxiliary storage section 150 is capable to change the target address indicated by the read request from the CPU into an address at which the theft countermeasure program PG300 is stored.

Ordinarily, the activation program and area definition information illustrated in FIG. 7 are stored at the top address of the non-volatile storage medium 180.

A standard BIOS program executes processing for reading the activation program PG200 and the like from the top address of the non-volatile storage medium 180 after executing initialization processing of each of the hardware sections held by the terminal apparatus 100.

Therefore, by causing the auxiliary storage section 150 to change the address targeted, it is possible to activate the theft countermeasure program PG300 without modifying the standard BIOS program. The auxiliary storage section 150 is caused to change the address targeted by reading from the top address to the address at which the theft countermeasure program PG300 is stored, when a request to read the information stored at the top address of the non-volatile storage medium 180 is accepted for the first time after power is on.

Figure 5:
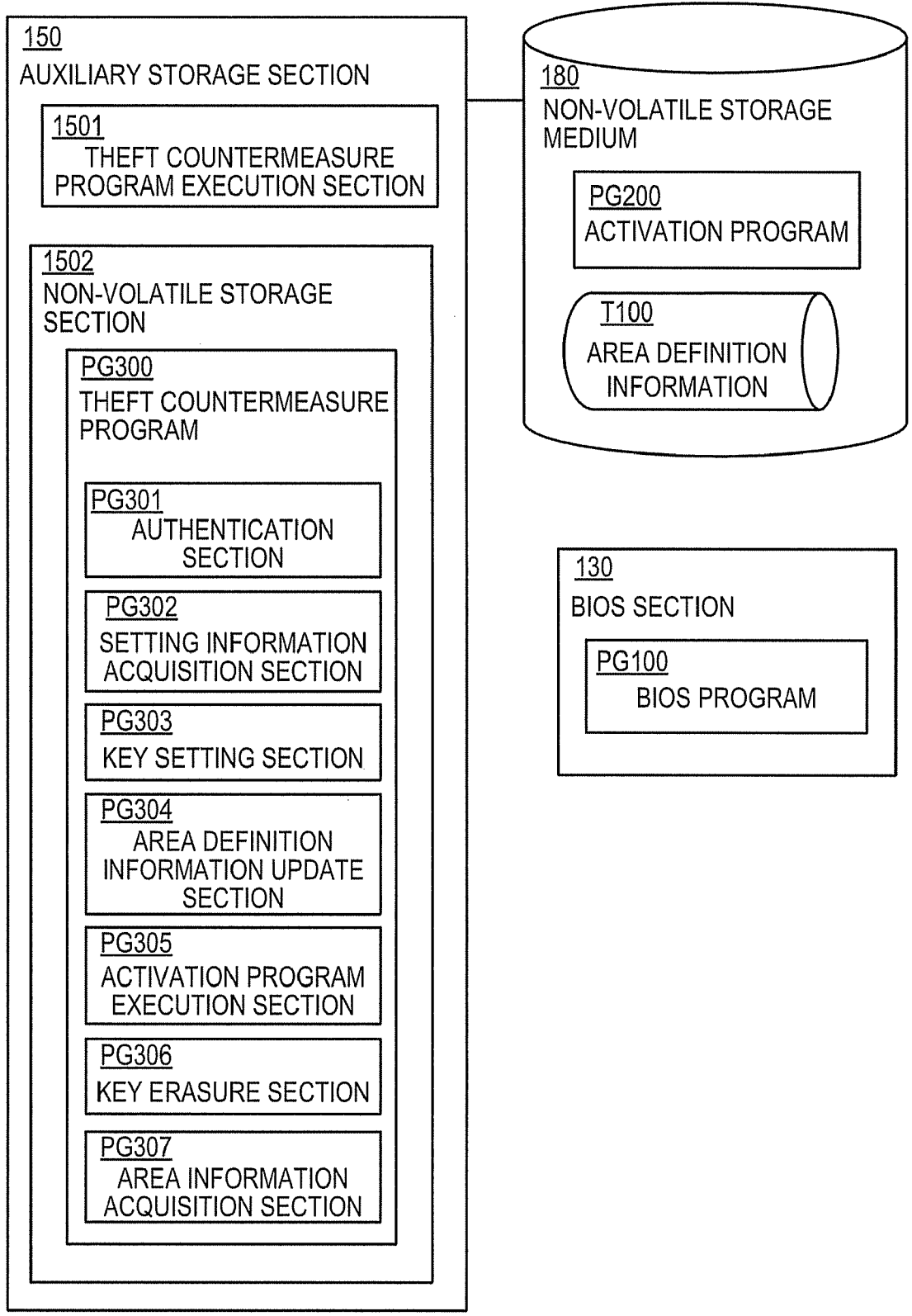
FIG. 5 is a diagram illustrating the configuration and storage place of a program to be executed by the terminal apparatus (3)

FIG. 5 illustrates an example in which the theft countermeasure program PG300 is stored in a non-volatile storage section 1502. The non-volatile storage section 1502 provides storage areas different from those of the non-volatile storage medium 180 held by the auxiliary storage section 150.

In the storage example illustrated in FIG. 5, the auxiliary storage section 150, which has received an instruction from the CPU 110 that executes the BIOS program PG100, reads the theft countermeasure program PG300 stored in the non-volatile storage section 1502 and executes the theft countermeasure program PG300 using a theft countermeasure program execution section 1501.

In the example illustrated in FIG. 5, the theft countermeasure program execution section 1501 held by the auxiliary storage section 150 is a CPU (Central Processing Unit), an MPU (Micro Processing Unit) or the like implemented inside the auxiliary storage section 150.

In this case, if accepting a request to read information stored at the top address of the non-volatile storage medium 180 for the first time after power is on, the auxiliary storage section 150 changes the reading target to the theft countermeasure program PG300 stored in the non-volatile storage section 1502.

Though the example illustrated in FIG. 5 shows an example of the theft countermeasure program execution section 1501 held by the auxiliary storage section 150 executing the theft countermeasure program PG300, this embodiment is not limited thereto.

For example, in the example illustrated in FIG. 5, a configuration is also possible in which the theft countermeasure program PG300 read from the non-volatile storage section 1502 is stored into the main storage section 120 and executed by the CPU 110.

In this case, the theft countermeasure program execution section 1501 can be omitted from the auxiliary storage section 150 illustrated in FIG. 5.

In the examples illustrated in FIGS. 4 and 5, even if the auxiliary storage section 150 is detached from the terminal apparatus (first apparatus) and is incorporated into other terminal apparatus 100 (second apparatus), the theft countermeasure program PG300 according to this embodiment can be executed on the terminal apparatus 100 (second apparatus).

Thus, the theft countermeasure program PG300 according to this embodiment can be stored in various storage areas in the terminal apparatus 100.

4. Hardware Configuration of Management Apparatus

Figure 10:
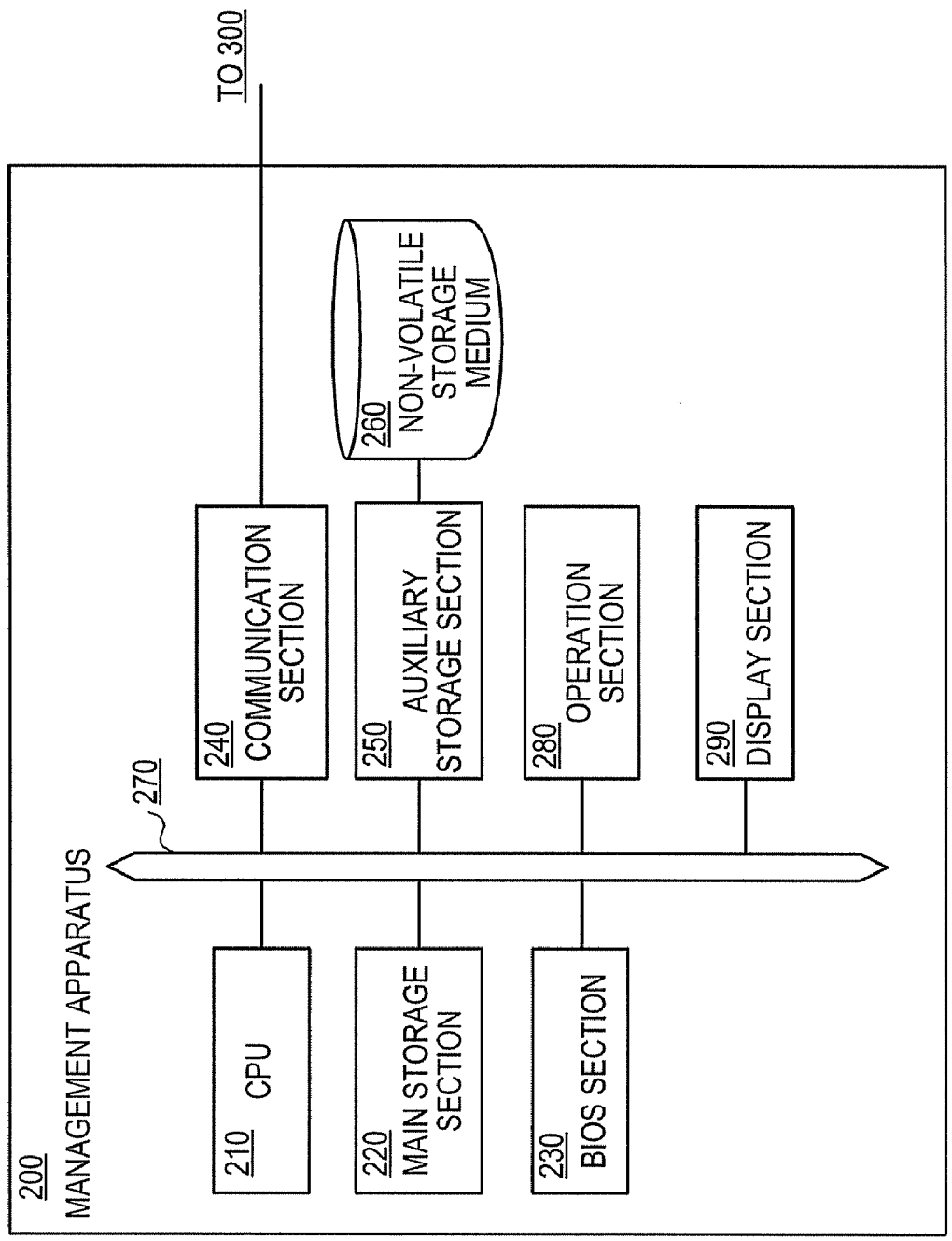
FIG. 10 is a diagram illustrating the hardware configuration of a management apparatus.

FIG. 10 illustrates the hardware configuration of the management apparatus 200.

The management apparatus 200 illustrated in FIG. 10 includes a CPU (Central Processing Unit) 210, a main storage section 220, a BIOS (Basic Input Output System) section 230, a communication section 240, an auxiliary storage section 250, a non-volatile storage medium 260, a communication line 270, an operation section 280 and a display section 290.

The CPU 210 is connected to each of the hardware sections of the terminal apparatus 100 via the communication line 270 and realizes a given function by executing a procedure according to a program.

The CPU 210 includes, for example, an instruction register for temporarily storing an instruction read from the main storage section 120. The CPU 210 includes an instruction decoder for decoding a machine instruction (binary) stored in the instruction resistor and controlling each section held by the terminal apparatus 100 in accordance with the instruction. The CPU 210 includes an arithmetic logic unit for performing operation such as addition, subtraction and comparison of numerical values in accordance with control by the instruction decoder. The CPU 210 includes an accumulator for temporarily storing data targeted by the operation, the result of the operation or the like. The CPU 210 includes an address resistor for storing the address of a storage area held by the main storage section 220 where the CPU 210 performs reading or writing. The CPU 210 includes a program counter indicating the address of a storage held by the main storage section 220 in which an instruction to be executed next is stored, and the like.

The main storage section 220 stores data generated by execution by the CPU 210 or data read from the auxiliary storage section 250.

For example, the main storage section 120 may be a semiconductor memory such as an SDRAM (Synchronous Dynamic Random Access Memory) and SRAM (Static Random Access Memory) is used.

The BIOS section 230 is a unit that stores a BIOS program which causes the CPU 210 to execute initialization processing of the hardware executed first when the terminal apparatus 100 is powered on, and the like.

For example, the BIOS section 230 may be a non-volatile semiconductor memory, such as a flash memory and an EEPROM (Electrically Erasable Programmable Read Only Memory).

The communication section 240 is a unit that transmits and receives signals to and from the terminal apparatus 100 via the communication network 300, which may be wired or wireless.

The auxiliary storage section 250 is a unit that stores information into the non-volatile storage medium 260 in response to a write instruction received from the CPU 210. The auxiliary storage section 250 reads and outputs the information stored in the non-volatile storage medium 260 in response to a read instruction received from the CPU 210.

The auxiliary storage section 250 is, for example, a magnetic recording device such as an HDD (Hard Disk Drive) or a non-volatile semiconductor storage device such as an SSD (Solid State Disk).

The non-volatile storage medium 260 is, for example, a magnetic recording medium or a non-volatile semiconductor memory.

The non-volatile storage medium 260 may be stored inside the auxiliary storage section 250 or may be a portable non-volatile storage medium which is inserted from outside the management apparatus 200.

The operation section 280 is a unit that accepts an operation by a user.

The operation section 280 is a unit that outputs a signal corresponding to the operation by the user to the CPU 210 via the communication line 270.

For example, the operation section may be a keyboard, an indication device such as a mouse and a touch pad, an input button and the like.

The display section 290 is a unit that causes a display device, such as a liquid crystal display device, to output information in accordance with a control instruction from the CPU 210.

The display device may be connected to the terminal apparatus 100 through a communication line held inside the terminal apparatus 100 and integrated with the terminal apparatus 100, or may be connected to the terminal apparatus 100 through a 15 pin D-Sub (D-Subminiature) connector or the like.

5. Configuration of Program to be Executed by Management Apparatus

Figure 11:
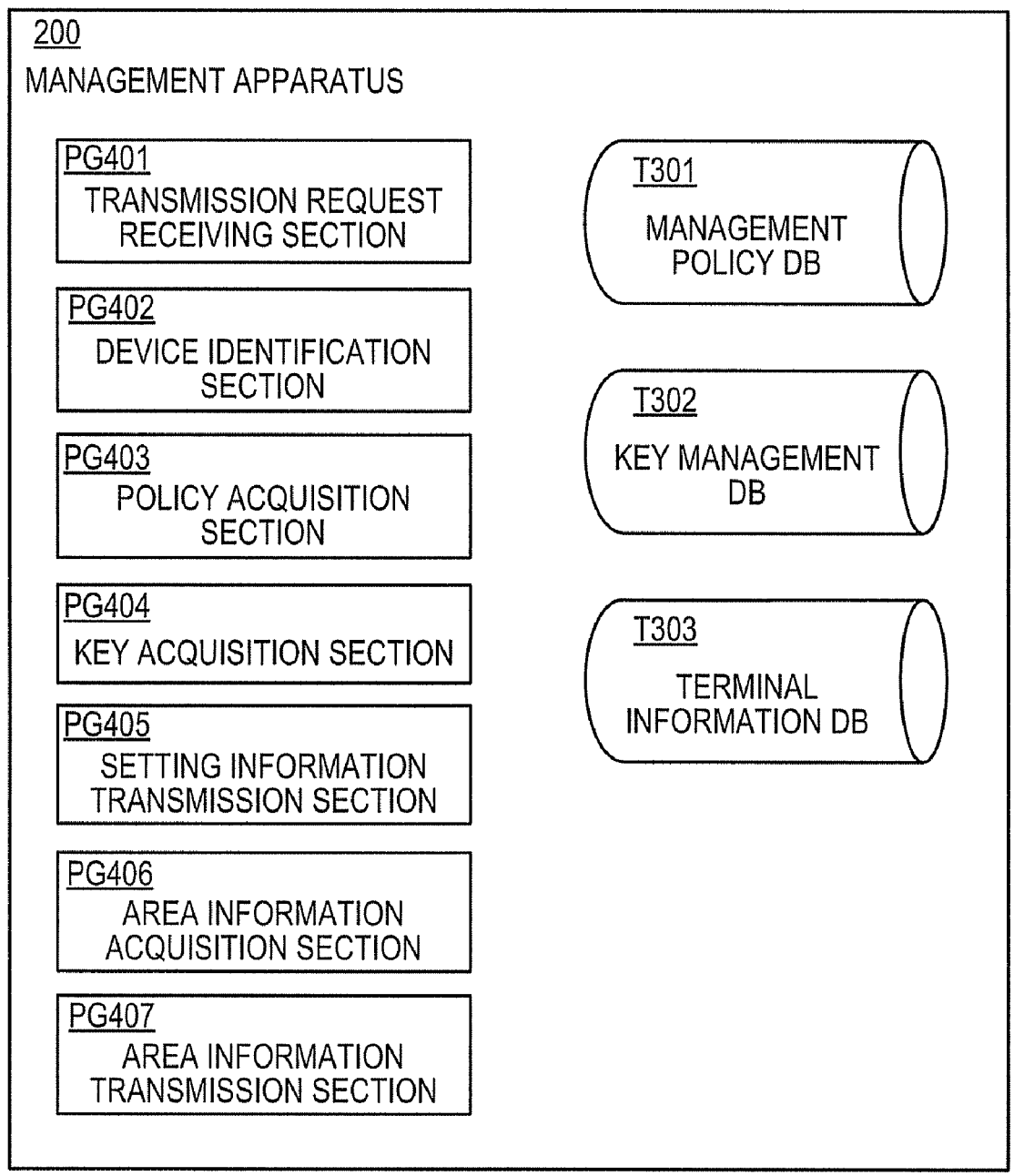
FIG. 11 is a diagram illustrating the configuration of a program to be executed by the terminal apparatus.

FIG. 11 illustrates the configuration of a program to be executed by the management apparatus 200.

A transmission request receiving section PG401 is a software unit that causes the CPU 210 to operate as a component which receives a setting information transmission request or an area information transmission request which is transmitted from the terminal apparatus 100 using the communication section 240.

A device identification section PG402 is a software unit that causes the CPU 210 to operate as a component which identifies the terminal apparatus 100 on the basis of the received transmission request.

A policy acquisition section PG403 is a software unit that causes the CPU 210 to operate as a component which acquires policy information from information registered with various DB's (T301 and T303) on the basis of the received transmission request.

A key acquisition section PG 404 is a software unit that causes the CPU 210 to operate as a component which acquires key data from the key management DB (T302) on the basis of the received transmission request.

A setting information transmission section PG405 is a software unit that causes the CPU 110 to operate as a component which transmits setting information generated with the use of the acquired policy information, the key data and the like to the terminal apparatus 100 which has transmitted the transmission request using the communication section 240.

An area information acquisition section PG406 is a software unit that causes the CPU 210 to operate as a component which acquires area information from information registered with various DB's (T301) on the basis of the received transmission request.

An area information transmission section PG407 is a software unit that causes the CPU 210 to operate as a component which transmits the acquired area information to the terminal apparatus 100 which has transmitted the transmission request using the communication section 240.

The management policy DB (T301) has device identification information (T3011), the area information (T3012) and the definition information (T3015) (see FIG. 12).

The device identification information (T3011) is information for identifying the terminal apparatus 100, and it may be any information that can at least classify the terminal apparatus 100.

For example, the device identification information (T3011) may be the manufacturer number of the terminal apparatus 100, a MAC address set for the communication section 140 held by the terminal apparatus 100, a manufacturer number set for the auxiliary storage section 150 held by the terminal apparatus 100, information identifying the user of the terminal apparatus 100 or the like.

The area information (T3012) indicates information about the storage areas set in the non-volatile storage medium 180 held by the terminal apparatus 100.

The area information (T3012) illustrated in FIG. 13 includes area identification information (T3013) and an area classification (T3014).

The area identification information (T3013) illustrated in FIG. 13 indicates information identifying one or more storage areas held by the non-volatile storage medium 180 held by the terminal apparatus 100.

For example, the area identification information (T3013) may be partition numbers indicating element numbers of a partition table list of an MBR (Master Boot Record) defining the storage areas of the non-volatile storage medium 180 of the terminal apparatus 100.

The area classification (T3014) illustrated in FIG. 13 indicates classifications that are set to the storage areas of the non-volatile storage medium 180 that the terminal apparatus 100 includes.

For example, in the example in FIG. 8, the area classification may be a partition type (T18023) set in a partition table of the MBR (Master Boot Record) defining the storage areas of the non-volatile storage medium 180 of the terminal apparatus 100.

The definition information (T3015) indicates information defining the contents of the processing by the theft countermeasure program PG300.

The definition information (T3015) illustrated in FIG. 13 includes definition classification (T3016) and drive display (T3017).

The definition classification (T3016) illustrated in FIG. 13 indicates classification of the definition information (T3015).

The example in FIG. 13 illustrates that the definition classification (T3016) indicates "normal" or "restricted". The definition classification which value is "normal" indicates that the contents of processing performed at normal time are defined. The definition classification which value is "restricted" indicates that the contents of processing performed at the time of restriction for restricting use of a storage area held by the non-volatile storage medium 180 of the terminal apparatus 100 are defined.

The definition classification (T3016) is not limited to the two kinds of "normal" and "restricted". Three or more classifications may be defined.

For example, if values which can be set for the definition classification (T3016) are "classification 1", "classification 2", "classification 3" and "classification 4", the four kinds of definition classifications can be defined.

The drive display (T3017) in FIG. 13 illustrates information for controlling whether or not to enable a storage area set in the non-volatile storage medium 180 held by the terminal apparatus 100 to be displayed on the operating system.

The example in FIG. 13 illustrates that any of "permitted" indicating that the storage area is to be displayed and "not permitted" indicating that the storage area is not to be displayed are set as the drive display (T3017).

FIG. 13 illustrates an example where information (13-1) is registered with the management policy DB (T301) in which "0001", "1", "07", "normal" and "permitted" are set as the device identification information (T3011), the area identification information (T3013), the area classification (T3014), the definition classification (T3016) and the drive display (T3017), respectively.

This example in FIG. 13 illustrates that, among the storage areas held by the non-volatile storage medium 180 of the terminal apparatus 100 identified by device identification information "0001", the area classification of a storage area identified by area identification information "1" is "07", and that, as the contents of processing by the theft countermeasure program PG300 at normal time, the drive display of the storage area identified by the area identification information "1" is "permitted".

FIG. 13 also illustrates an example where information (13-2) is registered with the management policy DB (T301) in which "0001", "2", "07", "restricted" and "not permitted" are set as the device identification information (T3011), the area identification information (T3013), the area classification (T3014), the definition classification (T3016) and the drive display (T3017), respectively.

This example shows that, among the storage areas held by the non-volatile storage medium 180 of the terminal apparatus 100 identified by the device identification information "0001", the area classification of a storage area identified by area identification information "2" is "07", and that, as the contents of processing by the theft countermeasure program PG300 at the time of restriction, the drive display of the storage area identified by the area identification information "2" is "not permitted".

FIG. 13 also illustrates an example where information (13-3) is registered with the management policy DB (T301) in which "0001", "4", "00", "normal" and "-" are set as the device identification information (T3011), the area identification information (T3013), the area classification (T3014), the definition classification (T3016) and the drive display (T3017), respectively.

This example shows that, among the storage areas held by the non-volatile storage medium 180 of the terminal apparatus 100 identified by the device identification information "0001", the area classification of a storage area identified by area identification information "4" is "00", that is, the storage area identified by the area identification information "4" is not used or the storage area identified by the area identification information "4" does not exist.

Thus, the drive display (T3017) "-" illustrated in FIG. 13 indicates that, as the contents of processing by the theft countermeasure program PG300 at normal time, the drive display (T3017) of the storage area identified by the area identification information "4" is not set.

FIG. 14 illustrates the data structure of the key management DB (T302) (shown in FIG. 11).

The key management DB (T302) illustrated in FIG. 14 has device identification information (T3021), area identification information (T3022) and key data (T3023).

The device identification information (T3021) is information identifying the terminal apparatus 100, and it may be any information that can at least classify the terminal apparatus 100.

For example, the manufacturer number of the terminal apparatus 100, a MAC address set for the communication section 140 that the terminal apparatus 100 includes, a manufacturer number set for the auxiliary storage section 150 that the terminal apparatus 100 includes, information identifying the user of the terminal apparatus 100 or the like can be used as the device identification information (T3021).

The area identification information (T3022) indicates information identifying storage areas held by the non-volatile storage medium 180 of the terminal apparatus 100.

For example, partition numbers indicating element numbers of a partition table list of the MBR (Master Boot Record) defining the storage areas of the non-volatile storage medium 180 of the terminal apparatus 100 can be used.

That is, in the example illustrated in FIG. 7, since the partition number of a partition table 1 (T1802-1) is "1", the area identification information is "1". Since the partition number of a partition table 2 (T1802-2) is "2", the area identification information is "2". Since the partition number of a partition table 3 (T1802-3) is "3", the area identification information is "3". Since the partition number of a partition table 4 (T1802-4) is "4", the area identification information is "4".

The key data (T3023) indicates key data to be used for encryption processing and decryption processing in the terminal apparatus 100.

FIG. 15 illustrates the data structure of the terminal information DB (T303) (shown in FIG. 11).

The terminal information DB (T303) illustrated in FIG. 15 has device identification information (T3031) and state information (T3032).

The device identification information (T3031) is similar to the device identification information (T3021) of the key management DB (T302) illustrated in FIG. 14 which has been described above, and may be any information that can at least classify the terminal apparatus 100.

The state information (T3032) indicates information for setting the contents of processing by the theft countermeasure program PG300 executed in the terminal apparatus 100.

In the example illustrated in FIG. 15, the state information (T3032) about the terminal apparatus 100 identified by the device identification information "0001" indicates "normal".

That is, it is indicated that a state in which normal functions can be used is set for the terminal apparatus 100 identified by the device identification information "0001".

In the example illustrated in FIG. 15, the state information (T3032) about the terminal apparatus 100 identified by the device identification information (T3031) "0002" indicates "restricted".

That is, it is indicated that a state in which the use of the normal functions is restricted is set for the terminal apparatus 100 identified by the device identification information "0002".

In addition to the device identification information (T3011, T3021 and T3031), medium identification information which identifies the auxiliary storage section 150 or the non-volatile storage medium 180 held by the terminal apparatus 100 can be added to the various DB's (T301, T302 and T303) held by the management apparatus 200.

The data structure of the management policy DB (T301) illustrated in FIG. 20 shows an example of adding medium identification information (T3018) to the data structure of the management policy DB (T301) illustrated in FIG. 13.

The medium identification information (T3018) illustrated in FIG. 20 indicates information which identifies the auxiliary storage section 150 or the non-volatile storage medium 180 held by the terminal apparatus 100.

For example, a manufacturer number or the like set for the auxiliary storage section 150 or the non-volatile storage medium 180 can be used as the medium identification information (T3018).

In this case, as the device identification information (T3031), the manufacturer number of the terminal apparatus 100, a MAC address set for the communication section 140, information identifying the owner of the terminal apparatus 100 or the like can be used.

Thereby, it can be expected that the device identification accuracy can be improved in the device identification process (S202) executed in the management apparatus 200, in comparison with the device identification process using only the device identification information.

For example, when one the terminal apparatus 100 has multiple auxiliary storage sections 150 or non-volatile storage media 180, it is possible to make settings for the theft countermeasure process for each of the auxiliary storage sections 150 or the non-volatile storage media 180.

Furthermore, even if the auxiliary storage sections 150 or the non-volatile storage media 180 held by one terminal apparatus 100 are replaced with different ones and the different ones are used, it is possible to make settings for the theft countermeasure process for each of the auxiliary storage sections 150 or the non-volatile storage media 180.

Both of the data structure of the key management DB (T302) illustrated in FIG. 21 and the data structure of the terminal information DB (T303) illustrated in FIG. 22 similarly show examples of adding medium identification information (T3024 and T3033).

The configuration of the program to be executed by the management apparatus 200 has been described above.

6. Outline of Processing by Terminal Apparatus

Figure 17:
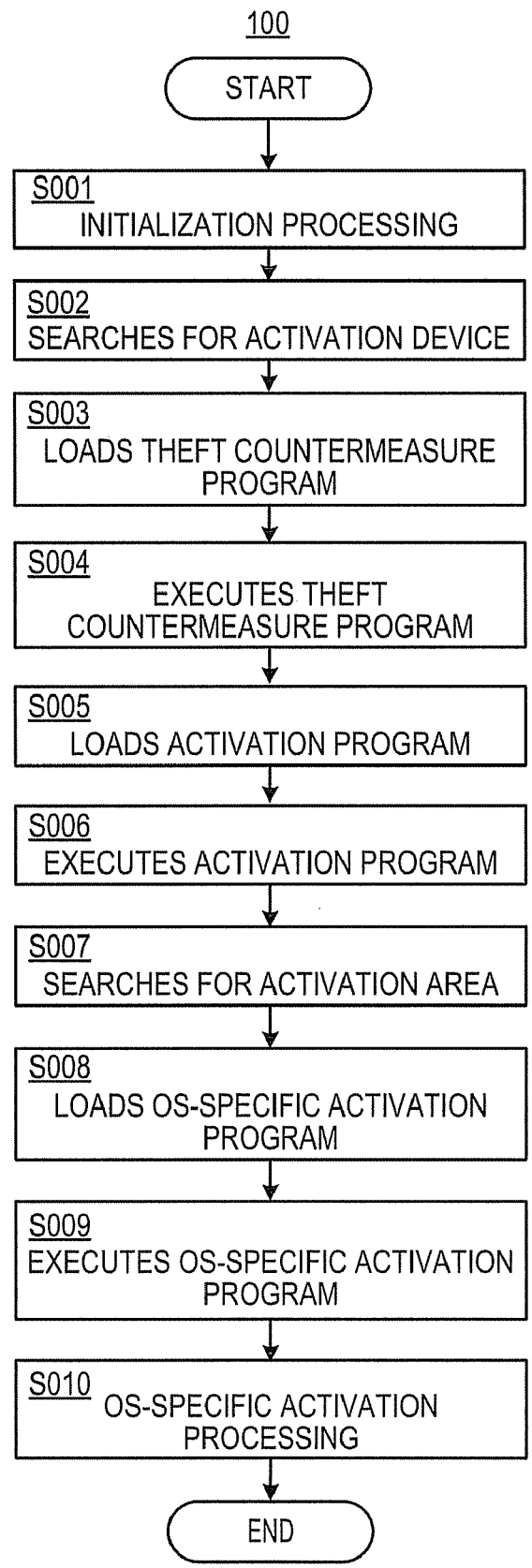
FIG. 17 is a diagram illustrating the outline of processing performed in the terminal apparatus at the time of activation.

FIG. 17 illustrates the outline of the process performed in the terminal apparatus 100 at the time of activation.

First, the terminal apparatus 100 starts the process at the time of activation in response to being powered on.

The terminal apparatus 100 executes the initialization process S001.

For example, the terminal apparatus 100 loads the BIOS program PG100 stored in the BIOS section 130 to the main storage section 120, and executes the BIOS program PG100 developed in the main storage section 120 using the CPU 110.

The CPU 110 of the terminal apparatus 100 initializes each device provided for the terminal apparatus 100 in accordance with control by the BIOS program PG100 (S001).

After initializing each device provided for the terminal apparatus 100 (S001), the CPU 110 which executes the BIOS program PG100 searches for a device which functions as an activation device (S002).

For example, a Floppy® disk drive (FDD), a hard disk drive (HDD), a CD-ROM drive (Compact Disc-Read Only Memory Drive) and the like are candidates for a device which functions as the activation device.

The CPU 110 which executes the BIOS program PG100 searches for the existence of each device in accordance with a given priority order, and detects a device with the highest priority among devices the existence of which has been confirmed, as the activation device (S002).

Next, the CPU 110 loads the theft countermeasure program PG300 to the main storage section 120 (S003).

The CPU 110 executes the theft countermeasure program PG300 developed in the main storage section 120 (S004).

The CPU 110 which executes the theft countermeasure program PG300 executes the theft countermeasure process to be described later, in accordance with a process defined by the theft countermeasure program PG300, and loads the activation program PG200 stored in the activation device detected at the process S002 described above to the main storage section 120 (S005).

FIG. 7 illustrates the data structure of the MBR (Master Boot Record) as an example of implementation of the activation program PG200 and the area definition information (T100).

The MBR illustrated in FIG. 7 has a bootstrap loader (T1801), a partition list (T1802) and a boot signature (T1803).

The partition list (T1802) illustrated in FIG. 7 has the partition table 1 (T1802-1) the partition number of which is "1", the partition table 2 (T1802-2) the partition number of which is "2", the partition table 3 (T1802-3) the partition number of which is "3" and the partition table 4 (T1802-4) the partition number of which is "4".

The bootstrap loader (T1801) illustrated in FIG. 7 corresponds to the activation program PG200.

The partition tables 1 to 4 (T1802-1, T1802-2, T1802-3 and T1802-4) illustrated in FIG. 7 correspond to the area definition information (T100).

The CPU 110 loads the bootstrap loader (T1801) illustrated in FIG. 7 to the main storage section 120 as the activation program PG200 to be loaded at the process S005 described above (S005).

After executing the theft countermeasure process to be described later, the CPU 110 executes the activation program PG200 developed in the main storage section 120 (S006).

The CPU 110 which executes the activation program PG200 refers to specification of activity (T1001) in the area definition information (T100) stored in the activation device and searches for an area set as an activation area (S007).

The CPU 110 refers to the partition table 1 (T1802-1), the partition table 2 (T1802-2), the partition table 3 (T1802-3) and the partition table 4 (T1802-4) shown FIG. 7 as the area definition information (T100) to be referred to at the process S007 described above.

FIG. 8 illustrates the data structure of the partition tables.

The partition table illustrated in FIG. 8 has a boot flag (T18021), a starting position (CHS address) (T18022), a partition type (T18023), an ending position (CHS address) (T18024), a starting position (LBA address) (T18025) and a total number of sectors (LBA address) (T18026).

The boot flag (T18021) illustrated in FIG. 8 corresponds to the specification of activity (T1001) in the area definition information (T100) illustrated in FIG. 6.

The starting position (CHS address) (T18022), the ending position (CHS address) (T18024), the starting position (LBA address) (T18025) and the total number of sectors (LBA address) (T18026) illustrated in FIG. 8 correspond to address information (T1003) in the area definition information (T100) illustrated in FIG. 6.

The partition type (T18023) illustrated in FIG. 8 corresponds to area classification (T1002) illustrated in FIG. 6.

The CPU 110 sequentially refers to the partition tables (T1802-1, T1802-2, T1802-3 and T1802-4) illustrated in FIG. 7. If the value shown as the boot flag (T18021 in FIG. 8; also referred to an active flag) held by the partition table is a value indicating activity (for example, 0x80), the CPU 110 judges that the area shown in the partition table is an active prime area (activation area) (S007).

The CPU 110 loads an activation program specific to the operating system which is stored in the activation area identified at the process S007 described above, to the main storage section 120 (S008) and executes it (S009).

The CPU 110 which executes the activation program specific to the operating system executes the activation process specific to the operation system (S0110) to activate the operating system.

The outline of the process performed in the terminal apparatus 100 at the time of activation, which is illustrated in FIG. 17, has been described.

7. Flow of Processing at the Time of Activation

Next, a process for the theft countermeasure program PG300 to be executed by the terminal apparatus 100 at the process S004 described above will be described with reference to FIG. 18.

Figure 18:
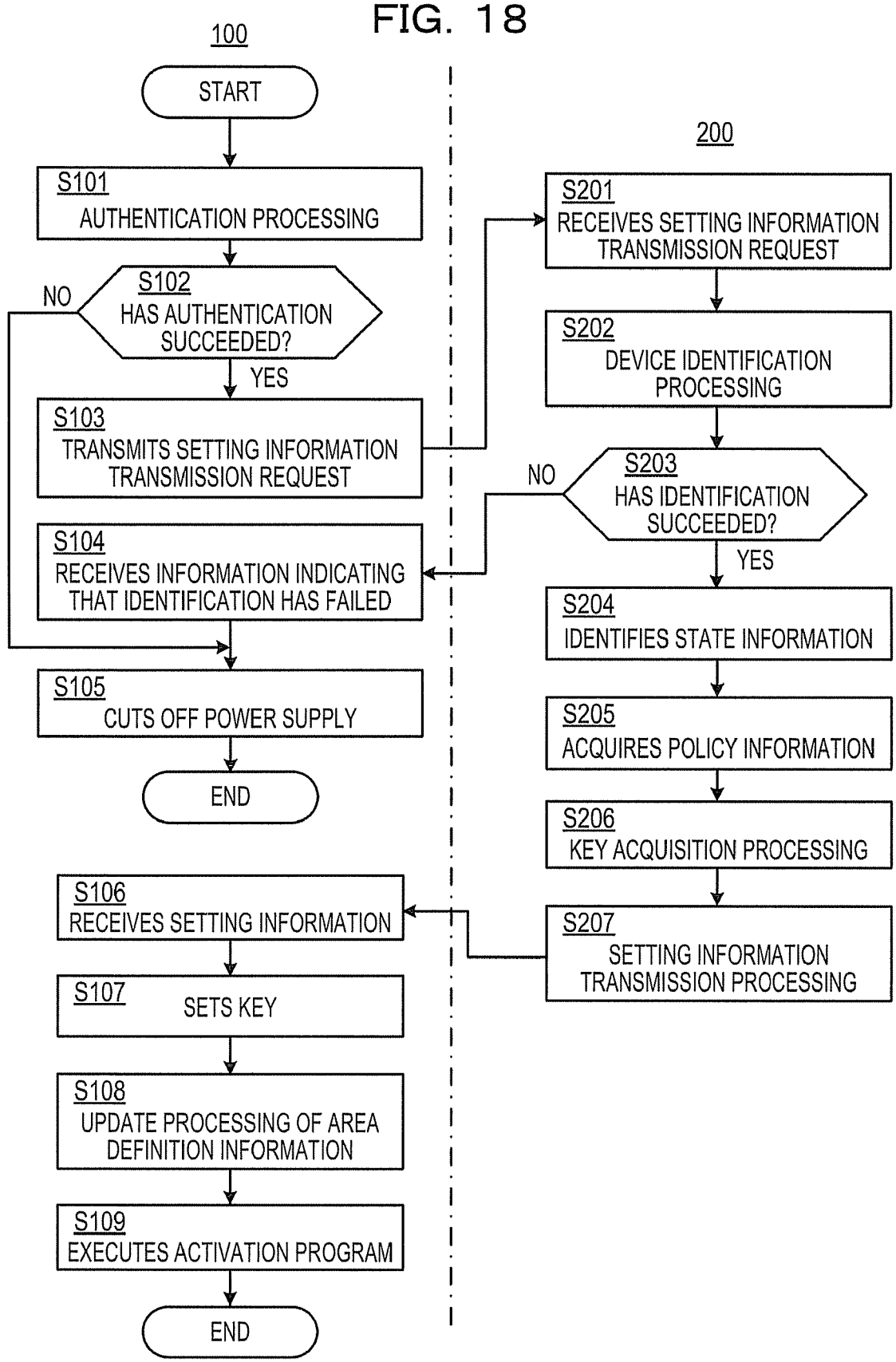
FIG. 18 is a diagram illustrating the flow of processing by the system performed when the terminal apparatus is activated.

FIG. 18 illustrates the flow of processing of the theft countermeasure program at the time of activation, which is executed at the process S004 described above.

First, the CPU 110 which functions as the authentication section PG301 executes the authentication process for judging whether or not the situation is such that the processing by the theft countermeasure program PG300 may be continued (S101).

That is, the CPU 110 judges whether or not the situation is such that the terminal apparatus 100 may be activated (S101).

For example, by comparing a user's input password inputted with the use of the operation section 160 and an authentication password stored in the BIOS section 130 or the like in advance, the CPU 110 can judge, if both data agree with each other, that the situation is such that the terminal apparatus 100 may be activated (S102: YES).

The password described above may be a character string expressed with alphanumeric characters or the like or may be biological information indicating the characteristics of the user's palm vein pattern or the like.

By transmitting a communication message to the management apparatus 200 connected via the communication network 300, using the communication section 140, the CPU 110 can judge, if receiving a response message from the management apparatus 200 within a given period, that the situation is such that the terminal apparatus 100 may be activated (S102: YES).

If judging that the situation is such that the terminal apparatus 100 may be activated, at the process S101 described above (S102: YES), the CPU 110 transmits a setting information transmission request to the management apparatus 200 connected via the communication network 300 using the communication section 140 (S103).

Here, the setting information transmission request has device identification information.

When transmitting the setting information transmission request to the management apparatus 200, the CPU 110 generates a transmission message indicating the setting information transmission request using, for example, identification information about the auxiliary storage section 150, such as a manufacturer number set for the auxiliary storage section 150, as the device identification information (S103).

The terminal apparatus 100 can acquire the serial number of the auxiliary storage section 150 by using, for example, an ATA command "IDENTIFY DEVICE".

As another example of the device identification information, the CPU 110 can also generate the transmission message indicating the setting information transmission request using, for example, a MAC address set for the communication section 140, the manufacturer number of the terminal apparatus 100 or the like as identification information (S103).

That is, any information that can classify the terminal apparatus 100 provided with the non-volatile storage medium 180 can be used as the device identification information.

For example, since information identifying the owner of the terminal apparatus 100 can classify the terminal apparatus 100 by identifying the owner, the information can be used as the device identification information.

Furthermore, the CPU 110 may include information (medium identification information) which identifies the auxiliary storage section 150 or the non-volatile storage medium 180 into the transmission message indicating the setting information transmission request at the process S103 described above.

Here, the CPU 110 can acquire the identification information about the auxiliary storage section 150, such as the manufacturer number set for the auxiliary storage section 150, from the auxiliary storage section 150 and use the identification information acquired from the auxiliary storage section 150 as the medium identification information.

In this case, the CPU 110 can use the manufacturer number of the terminal apparatus 100, a MAC address set for the communication section 140, information identifying the owner of the terminal apparatus 100 or the like as the device identification information.

Thereby, it can be expected that the device identification accuracy can be improved in the device identification process (S202) executed in the management apparatus 200, in comparison with the device identification process using only the device identification information.

For example, when one the terminal apparatus 100 has multiple non-volatile storage media 180, it is possible to make settings for the theft countermeasure process for each of the non-volatile storage media.

Furthermore, even if the non-volatile storage media held by one terminal apparatus 100 are replaced with different ones and the different ones are used, it is possible to make settings for the theft countermeasure process for each of the non-volatile storage media 180.

The management apparatus 200 receives the setting information transmission request transmitted from the terminal apparatus 100 connected via the communication network 300 (S201) and performs device identification processing on the basis of the received transmission request (S202).

For example, the CPU 210 of the management apparatus 200 refers to the terminal information DB (T303) to judge whether or not information corresponding to the device identification information included in the received transmission request is registered (S202).

The CPU 210 can also refer to the key management DB (T302) or the management policy DB (T301) to judge whether or not the information corresponding to the device identification information included in the received transmission request is registered (S202).

As a result, if the corresponding information is registered, the CPU 210 can judge that identification has succeeded (S203: YES).

On the other hand, if the corresponding information is not registered, the CPU 210 can judge that identification has failed (S203: NO).

If the medium identification information is included in the transmission request together with the device identification information and transmitted at the process S103 described above, the CPU 210 can judge whether or not identification has succeeded by judging whether or not information corresponding to the combination of the device identification information and the medium identification information included in the transmission request received at the process S201 described above is registered with the various DB's described above.

Thereby, even when one of the device identification information and the medium identification information corresponds, identification in the device identification process described above can be caused to fail.

For example, when it is attempted to incorporate a non-volatile storage medium 180 which has already been registered with the management apparatus 200 into a terminal apparatus 100 which is not registered with the management apparatus 200 and use it, it is possible to cause identification in the identification process (S202) described above to fail.

If judging that identification has succeeded (S203: YES), the CPU 210 refers to the terminal information DB (T303) to identify state information set for the terminal apparatus 100 which has transmitted the transmission request (S204).

On the other hand, if judging that identification has failed (S203: NO), the CPU 210 transmits information that identification has failed, to the terminal apparatus 100 which has transmitted the transmission request, using the communication section 240.

FIG. 15 illustrates the data structure of the terminal information DB (T303) and an example of the contents thereof.

The terminal information DB (T303) illustrated in FIG. 15 has the device identification information (T3031) and the state information (T3032).

The state information (T3032) functions as an item for setting the state of the terminal apparatus 100.

In the example illustrated in FIG. 15, the state information (T3032) about the terminal apparatus 100 identified by the device identification information (T3031) "0001" indicates "normal".

That is, it is indicated that a state in which normal functions can be used is set for the terminal apparatus 100 identified by the device identification information "0001".

On the other hand, in the example illustrated in FIG. 15, the state information (T3032) about the terminal apparatus 100 identified by the identification information (T3031) "0002" indicates "restricted".

That is, it is indicated that a state in which the use of the normal functions is restricted is set for the terminal apparatus 100 identified by the device identification information "0002".

The CPU 210 of the management apparatus 200 acquires policy information corresponding to the state information identified at the process S204 described above, from the management policy DB (T301) (S205).

That is, the CPU 210 identifies area information (T3012) corresponding to the device identification information shown in the received transmission request, and identifies definition information in which definition classification (T3016) corresponding to the state information is set among the definition information (T3015) associated with the identified area information.

For example, if the state information (T3022) is "normal", definition information in which the definition classification (T3016) is "normal" is identified.

The CPU 210 generates policy information on the basis of the identified area information (T3012) and definition information (T3015) (S205).

FIG. 16 illustrates an example of the contents of the policy information.

The policy information illustrated in FIG. 16 has area identification information (T3041) and drive display (T3042).

The area identification information (T3041) corresponds to the area identification information (T3013) held by the area information (T3012) registered with the management policy DB (T301).

The drive display (T3042) corresponds to the drive display (T3017) held by the definition information (T3015) registered with the management policy DB (T301).

The example illustrated in FIG. 16 shows policy information acquired on the basis of area information (T3012) corresponding to the device identification information (T3011) "0001" and definition information in which the definition classification (T3016) is "normal" in the example of the contents of the management policy DB (T301) illustrated in FIG. 13.

That is, the policy information illustrated in FIG. 16 has a combination of area identification information "1" and drive display "permitted", a combination of area identification information "2" and drive display "permitted", a combination of area identification information "3" and drive display "permitted", and a combination of area identification information "4" and drive display "-".

The drive display "-" corresponding to the area identification information "4" indicates that the storage area identified by the area identification information "4" is not set.

The area classification (T3014) held by the area information may be included in the policy information.

Next, the management apparatus 200 acquires key data corresponding to the device identification information shown in the received transmission request, from the key management DB (T302) (S206).

FIG. 14 illustrates the data structure of the key management DB (T302).

The key management DB illustrated in FIG. 14 has the device identification information (T3021), the area identification information (T3022) and the key data (T3023).

The area identification information (T3022) is information identifying the storage areas configured in the non-volatile storage medium 180 held by a terminal apparatus 100 identified by the device identification information (T3021).

The key data (T3023) indicates key data to be used for encryption and decryption processing of information stored in a storage area identified by the area identification information (T3022).

In the example illustrated in FIG. 14, the area identification information (T3022) in the key management DB (T302) may be omitted.

For example, when shared key data is used for the storage areas set on the non-volatile storage medium 180, the area identification information (T3022) may be omitted in the key management DB (T302).

At the process S206 described above, the CPU 210 of the management apparatus 200 may control whether or not to acquire key data from the key management DB (T302) on the basis of the drive display (T3042) shown in the policy information acquired at S205 described above.

For example, for a storage area identified by area identification information (T3041) corresponding to the drive display (T3042) indicating "permitted" in the acquired policy information, key data is acquired from the key management DB (T302).

On the other hand, for a storage area identified by area identification information (T3041) corresponding to the drive display (T3042) indicating "not permitted" in the acquired policy information, key data is not acquired from the key management DB (T302).

Thereby, for a storage area which is not to be displayed on the file system of the operating system (OS), key data is not transmitted to the terminal apparatus 100.

Thus, it is difficult to restore data stored in a storage area which is not to be displayed on the file system of the operating system (OS), in the terminal apparatus 100, and leakage of information can be effectively suppressed.

The CPU 210 of the management apparatus 200 generates setting information having the policy information acquired at the process S205 described above and the key data acquired at the process S206 described above, and transmits the setting information to the terminal apparatus 100 which has transmitted the setting information transmission request using the communication section 240 (S207).

FIG. 9 illustrates the data structure of the setting information.

The data structure of the setting information illustrated in FIG. 9 has the number of list elements (T1501), area identification information (T1502), key data (T1503) and drive display (T1504).

The number of list elements (T1501) illustrated in FIG. 9 indicates the number of combination elements of the area identification information (T1502), the key data (T1503) and the drive display (T1504) included in the setting information.

The area identification information (T1502) illustrated in FIG. 9 corresponds to the area identification information (T3041) shown in the policy information (see FIG. 16) acquired at the process S205 described above.

The key information (T1503) illustrated in FIG. 9 corresponds to the key data acquired at the process S206 described above.

The drive display (T1504) illustrated in FIG. 9 corresponds to the drive display (T3042) shown in the policy information (see FIG. 16) acquired at the process S205 described above.

The CPU 210 of the management apparatus 200 may omit the key data among the elements of the setting information transmitted at the process S207 described above.

For example, when encryption and decryption processing of information to be stored into the non-volatile storage medium 180 is not performed or key data used for encryption and decryption processing is acquired from a source other than the setting information, in the terminal apparatus 100, the CPU 210 of the management apparatus 200 can omit the key data among the elements of the setting information transmitted at the process S207 described above.

In this case, the key data acquisition process at the process S206 described above may be omitted.

When key data is included in the transmission request received at the process S201 described above, the CPU 210 may encrypt the setting information to be transmitted at the process S207 described above using the key data included in the received transmission request and transmit the setting information to the terminal apparatus 100.

In this case, it is desirable that a public key by a public key cryptosystem is used as the key data to be included in the transmission request transmitted at the process S103 described above.

The terminal apparatus 100 receives the setting information transmitted from the management apparatus 200 connected via the communication network 300 (S106) and performs various setting processes (S107 and S108).

For example, if key data is included in the setting information, the CPU 110 of the terminal apparatus 100 sets the key data included in the received setting information, in the auxiliary storage section 150 (S107).

For example, the key data is stored into a storage section provided within the auxiliary storage section 150 separately from the non-volatile storage medium 180.

The CPU 110 of the terminal apparatus 100 also sets the area definition information (T100) held by the non-volatile storage medium 180 on the basis of the policy information included in the received setting information.

That is, the CPU 110 reads the area definition information (T100) from the non-volatile storage medium 180 using the auxiliary storage section 150 and stores the read area definition information (T100) into the main storage section 120.

The CPU 110 updates the area classification (T1002) in the area definition information (T100) stored into the main storage section 120, on the basis of the policy information included in the received setting information.

The CPU 110 writes the updated area definition information (T100) into the non-volatile storage medium 180 using the auxiliary storage section 150.

Thereby, the CPU 110 updates the area definition information (T100) stored in the non-volatile storage medium 180, on the basis of the policy information included in the received setting information.

If the data item of the drive display (T3042) in the received policy information indicates "not permitted", the CPU 110 sets the area classification (T1002) in area definition information (T100) identified by corresponding area identification information (T3041) to a classification indicating an area which is not to be displayed on the file system of the operating system (OS).

Description will be made using the implementation example illustrated in FIG. 7.

In the example in FIG. 7, the received the area identification information (T3041) indicates the positions of partition tables (T1802) stored in the MBR.

That is, if the received area identification information (T3041) indicates "1", the partition table 1 (T1802-1) is identified.

If the received area identification information (T3041) indicates "2", the partition table 2 (T1802-2) is identified.

Description will be made using the implementation example illustrated in FIG. 8.

In the example in FIG. 8, the CPU 110 updates the value of the partition type (T18023) on the basis of the received policy information.

If the item of the drive display in the received policy information indicates "not permitted", the CPU 110 sets the value of the partition type (T18023) to a classification indicating an area which is not to be displayed on the file system of the operating system.

For example, any appropriate value other than values supported by the operating system can be set so that the operating system judges the area as an area which cannot be used.

It is also possible to set "00" indicating that the area is free space.

Next, the CPU 110 executes the activation program PG200 (S109).

That is, the CPU 110 refers to the specification of activity (T1001) in the area definition information to judge whether or not "active state" is set for the specification of activity.

By referring to a storage area indicated by the address information (T1003) in the area definition information in which "active state" is set, the CPU 110 identifies the place where the activation program PG200 is stored.

To explain this using the implementation example illustrated in FIG. 8, the CPU 110 refers to the boot flag (T18021) in the partition table to identify a partition for which "active state" is set.

By referring to a storage area indicated by the starting position (T18022) or the starting position (T18025) in the identified partition table, the CPU 110 identifies the place where the activation program PG200 is stored.

The CPU 110 reads the identified activation program PG200 using the auxiliary storage section 150 and stores the read activation program into the main storage section 120.

The CPU 110 starts processing by the activation program PG200 stored in the main storage section 120 and ends the theft countermeasure processing by the theft countermeasure program PG300.

On the other hand, if it is judged that the situation is not such that the terminal apparatus 100 may be activated, at the processing S101 described above (S102: NO), the CPU 110 ends the activation processing of the terminal apparatus 100 by cutting off the power supply of the terminal apparatus 100 (S105).

For example, by comparing a user's input password inputted with the use of the operation section 160 and an authentication password stored in the BIOS section 130 or the like in advance, the CPU 110 can judge, if both data do not agree with each other, that the situation is not such that the terminal apparatus 100 may be activated (S102: NO).

By transmitting a communication message to the management apparatus 200 connected via the communication network 300 using the communication section 140, the CPU 110 can judge, if it cannot receive a response message from the management apparatus 200 within a given period, that the situation is not such that the terminal apparatus 100 may be activated (S102: NO).

If it is judged that device identification has failed at the processing S203 described above in the management apparatus 200 (S203: NO), information to the effect that identification has failed is transmitted to the terminal apparatus 100 which has transmitted the transmission request.

The CPU 110 of the terminal apparatus 100 ends activation processing of the terminal apparatus 100 by cutting off the power supply of the terminal apparatus 100 when the terminal apparatus 100 has received the information that identification has failed.

The flow of the processing by the system performed when the terminal apparatus 100 is activated has been described.

In the above description, an embodiment has been shown in which, in response to a setting information transmission request being transmitted from the terminal apparatus 100 to the management apparatus 200 at the processing S103, the setting information is received from the management apparatus 200 at the processing S104. However, the present invention is not limited thereto.

For example, in response to receiving an activation instruction which instructs activation of the terminal apparatus 100, from the management apparatus 200, the terminal apparatus 100 may start the activation processing illustrated in FIG. 17.

In this case, by including the setting information into the activation instruction received from the management apparatus 200, the processing S103 and the processing S104 illustrated in FIG. 18 can be omitted.

8. Flow of Processing at the Time of Termination

Next, processing performed when the terminal apparatus 100 is terminated will be described with reference to FIG. 19.

Figure 19:
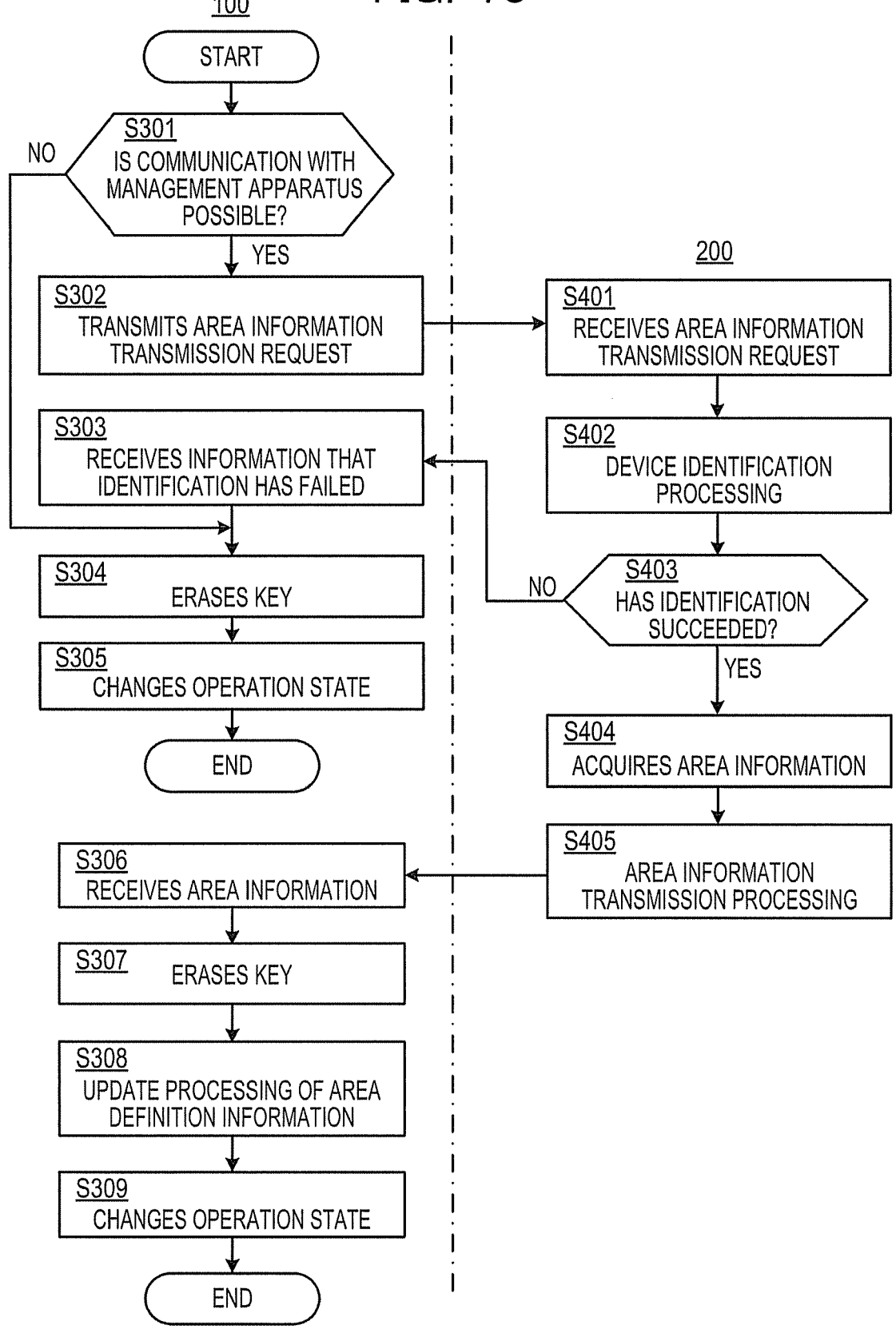
FIG. 19 is a diagram illustrating the flow of processing by the system performed when the terminal apparatus is terminated.

FIG. 19 illustrates the flow of processing by the system at when the terminal apparatus 100 is terminated.

The processing procedure illustrated in FIG. 19 is executed by the CPU 110 of the terminal apparatus 100 which functions as the authentication section PG301, the area definition information update section PG304, the key erasure section PG306 and the area information acquisition section PG307 held by the theft countermeasure program PG300 illustrated in FIG. 3 and the CPU 210 of the management apparatus 200 which functions as the transmission request receiving section PG401, the device identification section PG402, the area information acquisition section PG406 and the area information transmission section PG407 illustrated in FIG. 11.

For example, the CPU 110 of the terminal apparatus 100 starts the processing procedure illustrated in FIG. 19 when receiving an instruction to change the operation state of the terminal apparatus 100.

Here, the operation state change instruction includes changing the operation state to a termination state in which power supply to the terminal apparatus 100 is cut off to terminate the operation or a temporary termination state in which most of the operation is terminated while a part of power supply to the terminal apparatus 100 is continued.

First, the CPU 110 which functions as the authentication section PG301 executes authentication processing for judging whether or not the situation is such that the processing by the theft countermeasure program PG300 may be continued (S301).

That is, the CPU 110 judges whether communication with the management apparatus 200 is possible or not (S301).

By transmitting a communication message to the management apparatus 200 connected via the communication network 300, using the communication section 140, the CPU 110 judges, if receiving a response message from the management apparatus 200 within a given period, that communication with the management apparatus 200 is possible (S301: YES).

If judging that communication with the management apparatus 200 is possible (S301: YES), the CPU 110 transmits an area information transmission request to the management apparatus 200 (S302).

It is also possible to, if transmission request transmission processing fails as a result of executing processing for transmitting the area information transmission request to the management apparatus 200, judge that communication with the management apparatus 200 is not possible (S301: NO).

That is, in this case, the processing S302 described above is executed before performing the judgment processing at the processing S301 described above.

Here, the area information transmission request has device identification information.

When transmitting the setting information transmission request to the management apparatus 200, the CPU 110 generates a transmission message indicating the setting information transmission request using, for example, identification information about the auxiliary storage section 150, such as a manufacturer number set for the auxiliary storage section 150, as the device identification information (S302).

As another example of the device identification information, the CPU 110 can also generate the transmission message indicating the setting information transmission request using, for example, a MAC address set for the communication section 140, the manufacturer number of the terminal apparatus 100 or the like as identification information (S302).

That is, any information that can classify the terminal apparatus 100 provided with the non-volatile storage medium 180 can be used as the device identification information.

For example, since information identifying the owner of the terminal apparatus 100 can classify the terminal apparatus 100 by identifying the owner, the information can be used as the device identification information.

Furthermore, the CPU 110 may include information (medium identification information) which identifies the non-volatile storage medium 180 into the transmission message indicating the setting information transmission request at the processing S103 described above.

Here, the CPU 110 can acquire the identification information about the auxiliary storage section 150, such as the manufacturer number set for the auxiliary storage section 150, from the auxiliary storage section 150 and use the identification information acquired from the auxiliary storage section 150 as the medium identification information.

In this case, the CPU 110 can use a MAC address set for the communication section 140, information identifying the owner of the terminal apparatus 100 or the like as the device identification information.

The management apparatus 200 receives the area information transmission request transmitted from the terminal apparatus 100 connected via the communication network 300 (S401) and performs device identification processing on the basis of the received transmission request (S402).

For example, the CPU 210 of the management apparatus 200 refers to the terminal information DB (T303) to judge whether or not information corresponding to the device identification information shown in the received transmission request is registered (S402).

The CPU 210 can also refer to the key management DB (T302) or the management policy DB (T301) to judge whether or not the information corresponding to the device identification information shown in the received transmission request is registered (S402).

As a result, if the corresponding information is registered, the CPU 210 can judge that identification has succeeded (S403: YES).

On the other hand, if the corresponding information is not registered, the CPU 210 can judge that identification has failed (S403: NO).

If the transmission request transmitted at the processing S302 includes the medium identification information in addition to the device identification information, the CPU 210 can judge whether or not identification has succeeded by judging whether or not information corresponding to the combination of the device identification information and the medium identification information included in the transmission request received at the processing S401 described above is present in the various databases described above.

For example, the CPU 210 retrieves, from the various databases, information corresponding to the device identification information, and then retrieves, from the retrieved information, information corresponding to the medium identification information. Thereby, it is possible to, even when one terminal apparatus 100 has multiple non-volatile storage media 180, efficiently identify area information about each of the non-volatile storage media 180.

If the CPU 210 judges that identification has succeeded (S403: YES), the CPU 210 retrieves, from the management policy DB (T301), the area information (T3012) set for the terminal apparatus 100 which has transmitted the transmission request (S404).

The area information (T3012) illustrated in FIG. 13 has the area identification information (T3013) and the area classification (T3014).

The CPU 210 performs transmission to the terminal apparatus 100 which has transmitted the area information transmission request, using the communication section 240 (S406).

The terminal apparatus 100 receives the area information transmitted from the management apparatus 200 connected via the communication network 300 (S306) and performs various setting processes (S307 and S308).

For example, the CPU 110 causes key data set in the auxiliary storage section 150 to be erased from the auxiliary storage section 150 (S307).

The CPU 110 sets the area definition information (T100) held by the non-volatile storage medium 180 on the basis of the received area information.

That is, the CPU 110 reads the area definition information (T100) from the non-volatile storage medium 180 using the auxiliary storage section 150 and stores the read area definition information (T100) into the main storage section 120.

The CPU 110 updates the area classification held by the area definition information identified on the basis of the area identification information shown in the received area information, with area classification shown in the received area information.

The CPU 110 writes the updated area definition information (T100) into the non-volatile storage medium 180 using the auxiliary storage section 150.

Thereby, the CPU 110 can update the area classification in the area definition information updated at the processing S108 when the terminal apparatus 100 is activated, with the area information (T3012) registered with the management policy DB (T301) held by the management apparatus 200.

That is, if the area classification before the update at the processing S108 described above is registered with the management policy DB (T301) held by the management apparatus 200, the area classification before the update at the processing S108 described above can be restored by the processing S308 described above.

After the update processing (S308) described above ends, the CPU 110 changes the operation state of the terminal apparatus 100 to the termination state or the temporary termination state (S309) and ends the processing procedure illustrated in FIG. 19.

If it is judged that device identification has failed at the processing S402 described above in the management apparatus 200 (S403: NO), information to the effect that identification has failed is transmitted to the terminal apparatus 100 which has transmitted the transmission request.

Receiving the information to the effect that identification has failed, the CPU 110 of the terminal apparatus 100 causes the key data set in the auxiliary storage section 150 to be erased from the auxiliary storage section 150 (S304).

The CPU 110 changes the operation state of the terminal apparatus 100 to the termination state or the temporary termination state (S309) and ends the processing procedure illustrated in FIG. 19.

If it is judged that communication with the management apparatus 200 is not possible at the processing S301 described above (S301: NO), the CPU 110 similarly executes the processes S304 and S305 described above and ends the processing procedure illustrated in FIG. 19.

The flow of the processing by the system performed when the terminal apparatus 100 is terminated has been described.

Second Embodiment

1. Configuration of Program to be Executed by Terminal Apparatus According to Second Embodiment FIG. 23 illustrates the configuration and storage place of a program to be executed by a terminal apparatus 100 according to a second embodiment.

Figure 23:
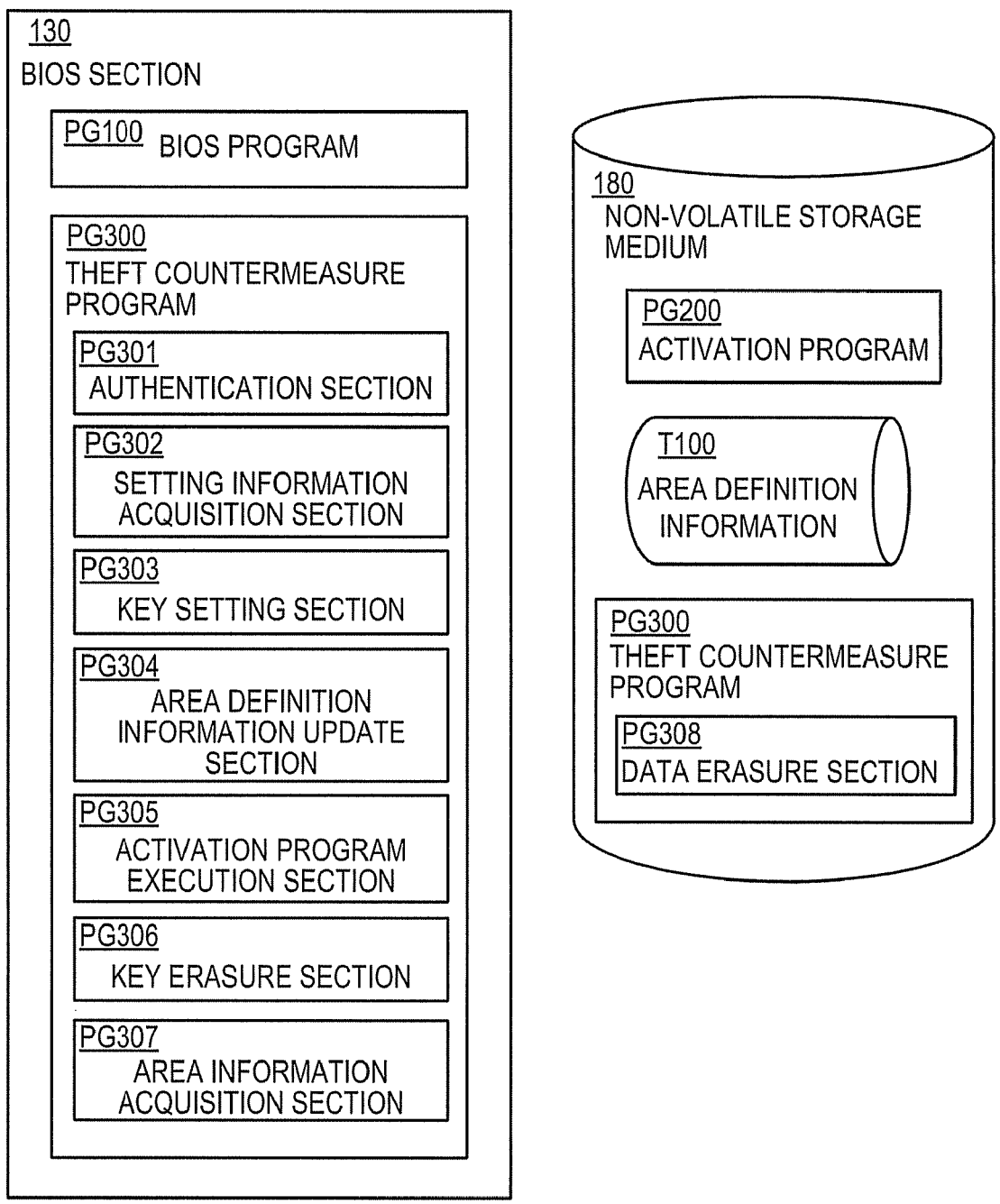
FIG. 23 is a diagram illustrating the configuration and storage place of a program to be executed by a terminal apparatus according to a second embodiment.

In the configuration of the program illustrated in FIG. 23, components similar to the components of the program according to the first embodiment (see FIG. 3) are given the same reference numerals.

The configuration of the program illustrated in FIG. 23 is different from the configuration illustrated in FIG. 3, for example, in that a data erasure section PG308 is added.

Therefore, description of the similar components will be partially omitted for simplification of description.

The data erasure section PG308 illustrated in FIG. 23 causes a CPU 110 to operate as a component which erases a storage area of a non-volatile storage medium 180 held by the terminal apparatus 100 on the basis of setting information acquired from a management apparatus 200.

In a program PG300 illustrated in FIG. 23, the data erasure section PG308 is stored in the non-volatile storage medium 180.

In the storage example illustrated in FIG. 23, the CPU 110 which executes a program constituting the operating system executes the data erasure section PG308 during execution of activation processing of the operating system or after completion of the activation processing.

For example, in the case of using Linux as the operating system, it is possible to execute the data erasure section PG308 in cooperation with the activation processing of the operating system by registering an activation script with /etc/rc.d or the like.

Similarly to the first embodiment, the theft countermeasure program PG300 according to this embodiment can be stored in various storage areas in the terminal apparatus 100.

2. Example of Contents of Management Policy DB According to Second Embodiment

FIG. 24 illustrates an example of the contents of a management policy DB (T301) according to the second embodiment.

In the management policy DB (T301) illustrated in FIG. 24, contents similar to the contents of the management policy DB (T301) according to the first embodiment are given the same reference numerals.

The management policy DB (T301) illustrated in FIG. 24 is different from the management policy DB (T301) illustrated in FIG. 13, for example, in that data erasure (T3018) is added to definition information (T3015).

Therefore, description of the same contents will be partially omitted for simplification of description.

The management policy DB (T301) illustrated in FIG. 24 has the item of the data erasure (T3018) in the definition information (T3015).

The data erasure (T3018) illustrated in FIG. 24 indicates information controlling whether data stored in a storage area set in the non-volatile storage medium 180 held by the terminal apparatus 100 is to be erased or not.

The example illustrated in FIG. 24 shows an example where any of "to be executed" indicating that data is to be erased and "not to be executed" indicating that data is not to be erased is set as the data erasure (T3018).

The data erasure (T3018) is not limited to the two kinds of "to be executed" and "not to be executed". Three or more erasure methods may be defined.

For example, three or more kinds of erasure methods may be defined, such as "not to be executed" indicating that data is not to be erased, "erasure 1" indicating that all data stored in an erasure target area is overwritten with given data values and "erasure 2" indicating that data stored in an erasure target area is partially overwritten with given data values.

FIG. 24 illustrates an example where information (24-1) is registered with the management policy DB (T301) in which "0001", "1", "07", "normal", "permitted" and "not to be executed" are set as device identification information (T3011), area identification information (T3013), area classification (T3014), definition classification (T3016), drive display (T3017) and the data erasure (T3018), respectively.

This example shows that, among the storage areas set in the non-volatile storage medium 180 held by the terminal apparatus 100 identified by device identification information "0001", the area classification of a storage area identified by area identification information "1" is "07"; that, as the contents of processing by the theft countermeasure program PG300 at normal time, the drive display of the storage area identified by the area identification information "1" is "permitted"; and that erasure processing of data stored in the storage area identified by the area identification information "1" is not to be executed.

FIG. 24 also illustrates an example where information (24-2) is registered with the management policy DB (T301) in which "0001", "3", "07", "restricted", "not permitted" and "to be executed" are set as the device identification information (T3011), the area identification information (T3013), the area classification (T3014), the definition classification (T3016), the drive display (T3017) and the data erasure (T3018), respectively.

This example shows that, among the storage areas set in the non-volatile storage medium 180 held by the terminal apparatus 100 identified by device identification information "0001", the area classification of a storage area identified by area identification information "3" is "07"; that, as the contents of processing by the theft countermeasure program PG300 at normal time, the drive display of a storage area identified by the area identification information "4" is "not permitted"; and that erasure processing of data stored in the storage area identified by the area identification information "4" is to be executed.

3. Flow of Processing at the Time of Activation According to Second Embodiment FIGS. 26 and 27 illustrate the flow of processing by a system when the terminal apparatus 100 according to the second embodiment is activated.

Figure 26:
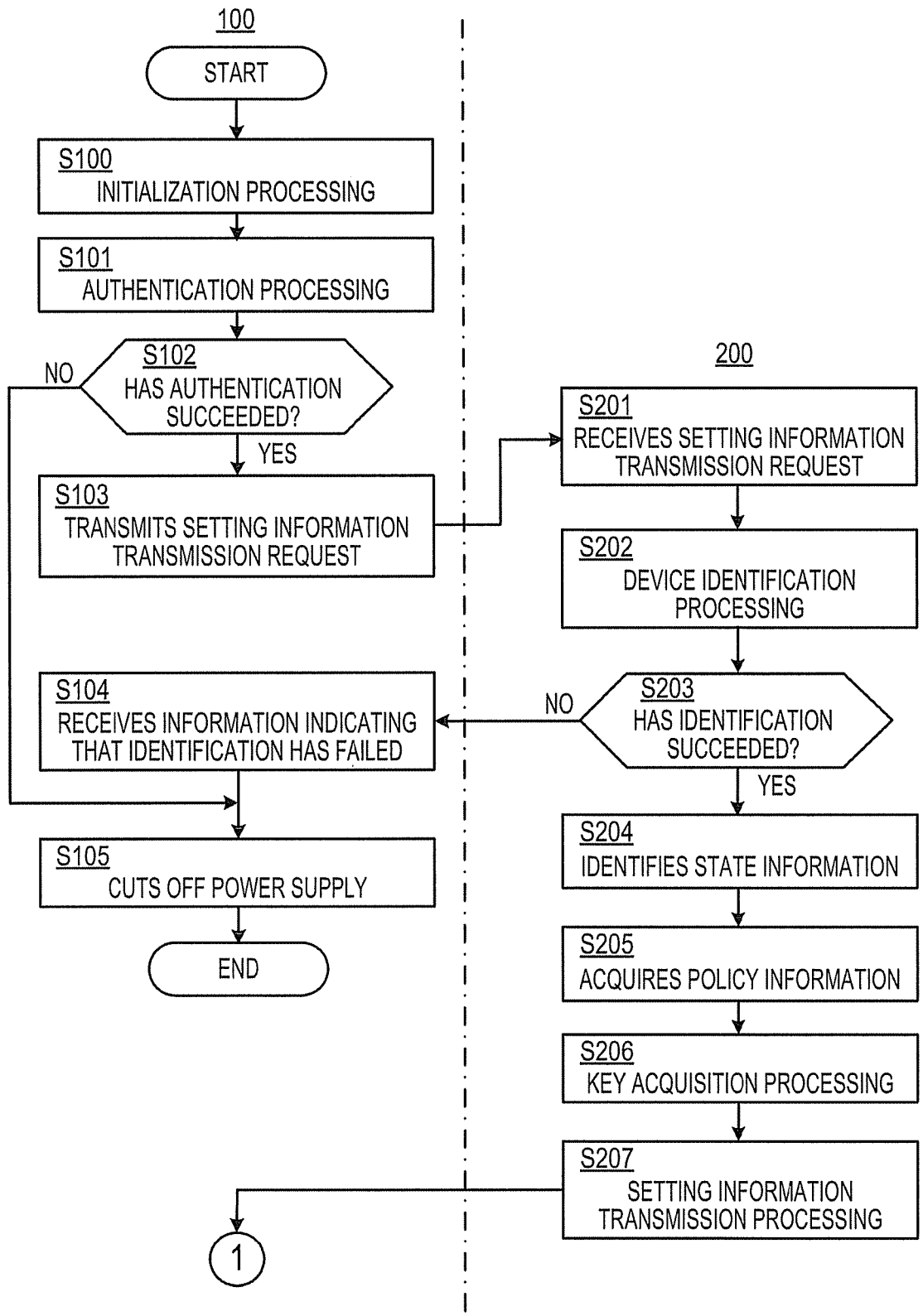
FIG. 26 is a diagram illustrating the flow of processing by a system performed when the terminal apparatus according to the second embodiment is activated.
Figure 27:
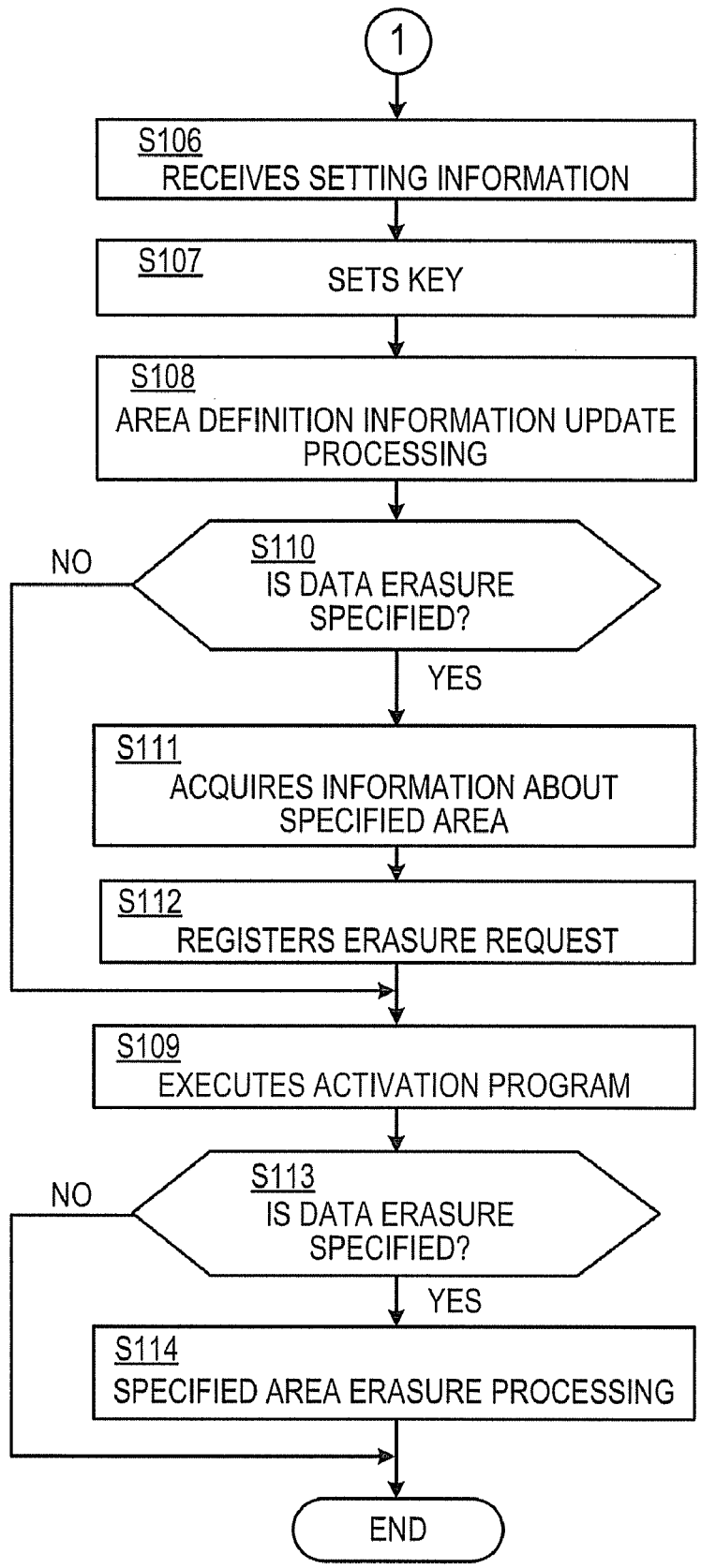
FIG. 27 is a diagram illustrating the flow of processing by the system performed when the terminal apparatus according to the second embodiment is activated (2)

In the processing procedures illustrated in FIGS. 26 and 27, contents similar to the contents of the flow of the processing by the system performed when the terminal apparatus 100 is activated, according to the first embodiment (see FIG. 18) are given the same reference numerals.

The processing procedures illustrated in FIGS. 26 and 27 are different from the flow of the processing illustrated in FIG. 18, for example, in that processing 5110 and processing 5114 are added.

Therefore, description of the same contents will be partially omitted for simplification of description.

First, the management apparatus 200 receives the setting information transmission request transmitted from the terminal apparatus 100 connected via a communication network 300 (S201) and performs device identification processing on the basis of the received transmission request (S202).

For example, a CPU 210 of the management apparatus 200 refers to a terminal information DB (T303) to judge whether or not information corresponding to the device identification information shown in the received transmission request is registered (S202).

The CPU 210 can also refer to a key management DB (T302) or the management policy DB (T301) to judge whether or not the information corresponding to the device identification information shown in the received transmission request is registered (S202).

As a result, if the corresponding information is registered, the CPU 210 can judge that identification has succeeded (S203: YES).

On the other hand, if the corresponding information is not registered, the CPU 210 can judge that identification has failed (S203: NO).

If the medium identification information is included in the transmission request together with the device identification information and transmitted at the processing S103 described above, the CPU 210 can judge whether or not identification has succeeded by judging whether or not information corresponding to the combination of the device identification information and the medium identification information included in the transmission request received at the processing S201 described above is registered with the various DB's described above.

Thereby, even when one of the device identification information and the medium identification information corresponds, identification in the device identification processing described above can be caused to fail.

For example, when it is attempted to incorporate a non-volatile storage medium 180 which has already been registered with the management apparatus 200 into a terminal apparatus 100 which is not registered with the management apparatus 200 and use it, it is possible to cause identification in the identification processing (S202) described above to fail.

If judging that identification has succeeded (S203: YES), the CPU 210 refers to the terminal information DB (T303) to identify state information set for the terminal apparatus 100 which has transmitted the transmission request (S204).

On the other hand, if judging that identification has failed (S203: NO), the CPU 210 transmits information to the effect that identification has failed, to the terminal apparatus 100 which has transmitted the transmission request, using a communication section 240.

The CPU 210 of the management apparatus 200 acquires policy information corresponding to the state information identified at the processing S204 described above, from the management policy DB (T301) (S205).

That is, the CPU 210 identifies area information (T3012) corresponding to the device identification information shown in the received transmission request, and identifies definition information in which definition classification (T3016) corresponding to the state information is set among definition information (T3015) associated with the identified area information.

For example, if state information (T3022) is "restricted", definition information in which the definition classification (T3016) is "restricted" is identified.

The CPU 210 generates policy information on the basis of the identified area information (T3012) and definition information (T3015) (S205).

FIG. 25 illustrates an example of the contents of the policy information.

The policy information illustrated in FIG. 25 has area identification information (T3041), drive display (T3042) and data erasure (T3043).

The area identification information (T3041) corresponds to the area identification information (T3013) held by the area information (T3012) registered with the management policy DB (T301).

The drive display (T3042) corresponds to the drive display (T3017) held by the definition information (T3015) registered with the management policy DB (T301).

The data erasure (T3043) corresponds to the data erasure (T3018) held by the definition information (T3015) registered with the management policy DB (T301).

The example illustrated in FIG. 25 shows policy information acquired on the basis of area information (T3012) corresponding to the device identification information (T3011) "0001" and definition information in which the definition classification (T3016) is "restricted" in the example of the contents of the management policy DB (T301) illustrated in FIG. 24.

That is, the policy information illustrated in FIG. 25 has a combination of area identification information "1", drive display "permitted" and data erasure "not to be executed", a combination of area identification information "2", drive display "not permitted" and data erasure "not to be executed", a combination of area identification information "3", drive display "not permitted" and data erasure "to be executed", and a combination of area identification information "4", drive display "-" and data erasure "-".

The drive display "-" and the data erasure "-" corresponding to the area identification information "4" indicate that the storage area identified by the area identification information "4" is not set.

The area classification (T3014) held by the area information may be included in the policy information.

Next, the management apparatus 200 acquires key data corresponding to the device identification information shown in the received transmission request from the key management DB (T302) (S206), generates setting information having the acquired key data and the policy information acquired at the processing S205 described above, and transmits the setting information to the terminal apparatus 100 which has transmitted the setting information transmission request using the communication section 240 (S207).

The CPU 210 of the management apparatus 200 may omit the key data among the elements of the setting information transmitted at the processing S207 described above.

For example, when encryption and decryption processing of information to be stored into the non-volatile storage medium 180 is not performed or key data used for encryption and decryption processing is acquired from a source other than the setting information, in the terminal apparatus 100, the CPU 210 of the management apparatus 200 can omit the key data among the elements of the setting information transmitted at the processing S207 described above.

In this case, the key data acquisition processing at the processing S206 described above may be omitted.

The terminal apparatus 100 receives the setting information transmitted from the management apparatus 200 connected via the communication network 300 (S106) and performs various setting processes (S107 and S108).

For example, if key data is included in the setting information, the CPU 110 of the terminal apparatus 100 sets the key data included in the received setting information, in an auxiliary storage section 150 (S107).

For example, the key data is stored into a storage section provided within the auxiliary storage section 150 separately from the non-volatile storage medium 180.

The CPU 110 of the terminal apparatus 100 also sets the area definition information (T100) held by the non-volatile storage medium 180 on the basis of the policy information included in the received setting information.

Next, the CPU 110 refers to the data erasure (T3043) in the policy information shown in the received setting information to judge whether execution of erasure processing of the data stored in a storage area is specified or not (S110).

For example, if "to be executed" is set for the data erasure (T3043) in the policy information shown in the received setting information, the CPU 110 judges that data erasure is specified (S110: YES).

On the other hand, if "not to be executed" is set for the data erasure (T3043) in the policy information shown in the received setting information, the CPU 110 judges that data erasure is not specified (S110: NO).

If judging that data erasure is specified at the processing S110, the CPU 110 acquires area definition information (T100) identified by area identification information (T3041) corresponding to the definition information of the data erasure (T3043) (S111).

Description will be made using the implementation example of the area definition information illustrated in FIG. 7.

In the example in FIG. 7, the received area identification information (T3041) indicates positions of partition tables (T1802) stored in the MBR.

That is, if the received area identification information (T3041) indicates "3", a partition table 3 (T1802-3) is identified.

The CPU 110 registers the erasure request for a storage area identified by address information (T1003) in the acquired the area definition information (T100) with a storage area which can be referred to by the CPU 110 which executes the data erasure section PG308 (S112).

The erasure request has, for example, information indicating the starting position of a storage area and information indicating the size of the storage area as information identifying an erasure target.

Description will be made using the implementation example illustrated in FIG. 8.

In the example illustrated in FIG. 8, a starting position (T18025) can be used as the information indicating the starting position of a storage area.

Furthermore, in the example illustrated in FIG. 8, the total number of sectors (T18026) can be used as the information indicating the magnitude of a storage area.

That is, in the implementation example illustrated in FIG. 8, the CPU 110 registers an erasure request having the starting position (T18025) and the total number of sectors (T18026) with a storage area (common area A) which can be referred to by the CPU 110 which executes the data erasure section PG308.

The storage area (common area A) which can be referred to by the CPU 110 which executes the data erasure section PG308 may be provided, for example, in a particular storage area of a main storage section 120 or a particular storage area of a BIOS section 130 or the non-volatile storage medium 180.

The CPU 110 executes an activation program PG200 (S109).

That is, the CPU 110 reads the activation program PG200 using the auxiliary storage section 150 and stores the read activation program PG200 into the main storage section 120.

The CPU 110 starts processing by the activation program PG200 stored in the main storage section 120 and ends the theft countermeasure processing by the theft countermeasure program PG300.

The CPU 110 which executes the activation program PG200 reads a program constituting the operating system stored in the non-volatile storage medium 180 using the auxiliary storage section 150 and stores the read program into the main storage section 120.

The CPU 110 executes the program constituting the operating system stored in the main storage section 120 to activate the operating system.

The CPU 110 which executes the program constituting the operating system reads the data erasure section PG308 stored in the non-volatile storage medium 180 using the auxiliary storage section 150 and stores the read data erasure section PG308 into the main storage section 120.

The CPU 110 executes data erasure section PG308 stored in the main storage section 120.

The CPU 110 which executes the data erasure section PG308 refers to the storage area (common area A) which the CPU 110 can refer to and judges whether an erasure request is registered or not (S113).

If an erasure request is registered with the common area A (S113: YES), the CPU 110 acquires information identifying a storage area targeted by the erasure request from the common area A and erases data stored in the targeted storage area (S114).

For example, the data can be erased by using an ATA command "CFA ERASE SECTORS".

In this case, the erasure target storage area can be specified by specifying an LBA (Logical Block Addressing) value indicating the starting position of the erasure target storage area and the total number of sectors indicating the magnitude of the erasure target storage area (see FIG. 28).

Here, by changing the setting of the area classification (T1002) in the area definition information to the classification indicating an area which is not to be displayed on the file system of the operating system (OS), at the processing S108 described above, the erasure target storage area is not displayed on the file system of the operating system when the erasure processing at the processing S114 described above is executed.

Therefore, it is possible to make it difficult for the operator of the terminal apparatus 100 to notice the erasure processing at the processing S114 described above.

The flow of the processing by the system performed when the terminal apparatus 100 according to the second embodiment is activated has been described.

Third Embodiment

1. Configuration of Program to be Executed by Terminal Apparatus According to Third Embodiment FIG. 29 illustrates an example of the configuration and storage place of a program to be executed by a terminal apparatus 100 according to a third embodiment.

Figure 29:
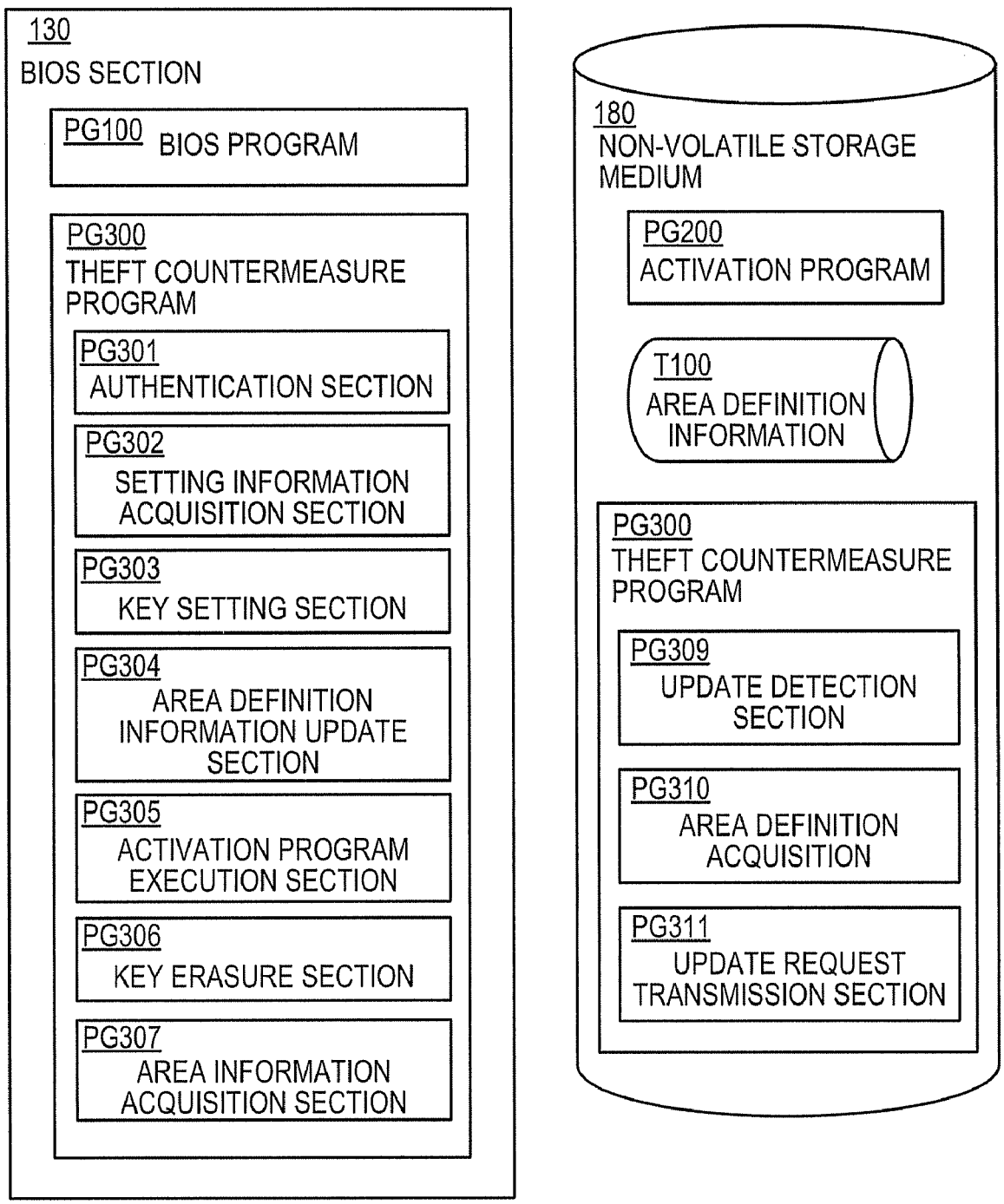
FIG. 29 is a diagram illustrating the configuration and storage place of a program to be executed by a terminal apparatus according to a third embodiment.

In the configuration of the program illustrated in FIG. 29, components similar to the components of the program to be executed by the terminal apparatus 100 according to the first embodiment (see FIG. 3) are given the same reference numerals.

The configuration of the program illustrated in FIG. 29 is different from the configuration illustrated in FIG. 3, for example, in that an update detection section PG309, an area definition acquisition section PG310 and an update request transmission section PG311 are added.

Therefore, description of the similar components will be partially omitted for simplification of description.

The update detection section PG309 illustrated in FIG. 29 causes a CPU 110 of the terminal apparatus 100 to operate as a component which detects that area definition information (T100) about a non-volatile storage medium 180 has been updated.

The area definition acquisition section PG310 illustrated in FIG. 29 causes the CPU 110 of the terminal apparatus 100 to operate as a component which, when detecting that the area definition information (T100) has been updated, acquires the updated area definition information (T100).

The update request transmission section PG311 illustrated in FIG. 29 causes the CPU 110 of the terminal apparatus 100 to operate as a component which transmits a request to update area information (T3012) in a management policy DB (T301) held by a management apparatus 200 to the management apparatus 200 using a communication section 140.

In a theft countermeasure program PG300 illustrated in FIG. 29, the update detection section PG309, the area definition acquisition section PG310 and the update request transmission section PG311 are stored in the non-volatile storage medium 180.

In the storage example illustrated in FIG. 29, the CPU 110 which executes a program constituting the operating system executes the update detection section PG309 after activation of the operating system is completed.

In the storage example illustrated in FIG. 29, the CPU 110 which functions as the update detection section PG309 further executes the area definition acquisition section PG310 and the update request transmission section PG311 when detecting update of the area definition information (T100).

Similarly to the first embodiment, the theft countermeasure program PG300 according to this embodiment can be stored in various storage areas in the terminal apparatus 100.

2. Configuration of Program to be Executed by Management Apparatus According to Third Embodiment FIG. 30 illustrates the configuration of a program to be executed by the management apparatus 200 according to the third embodiment.

Figure 30:
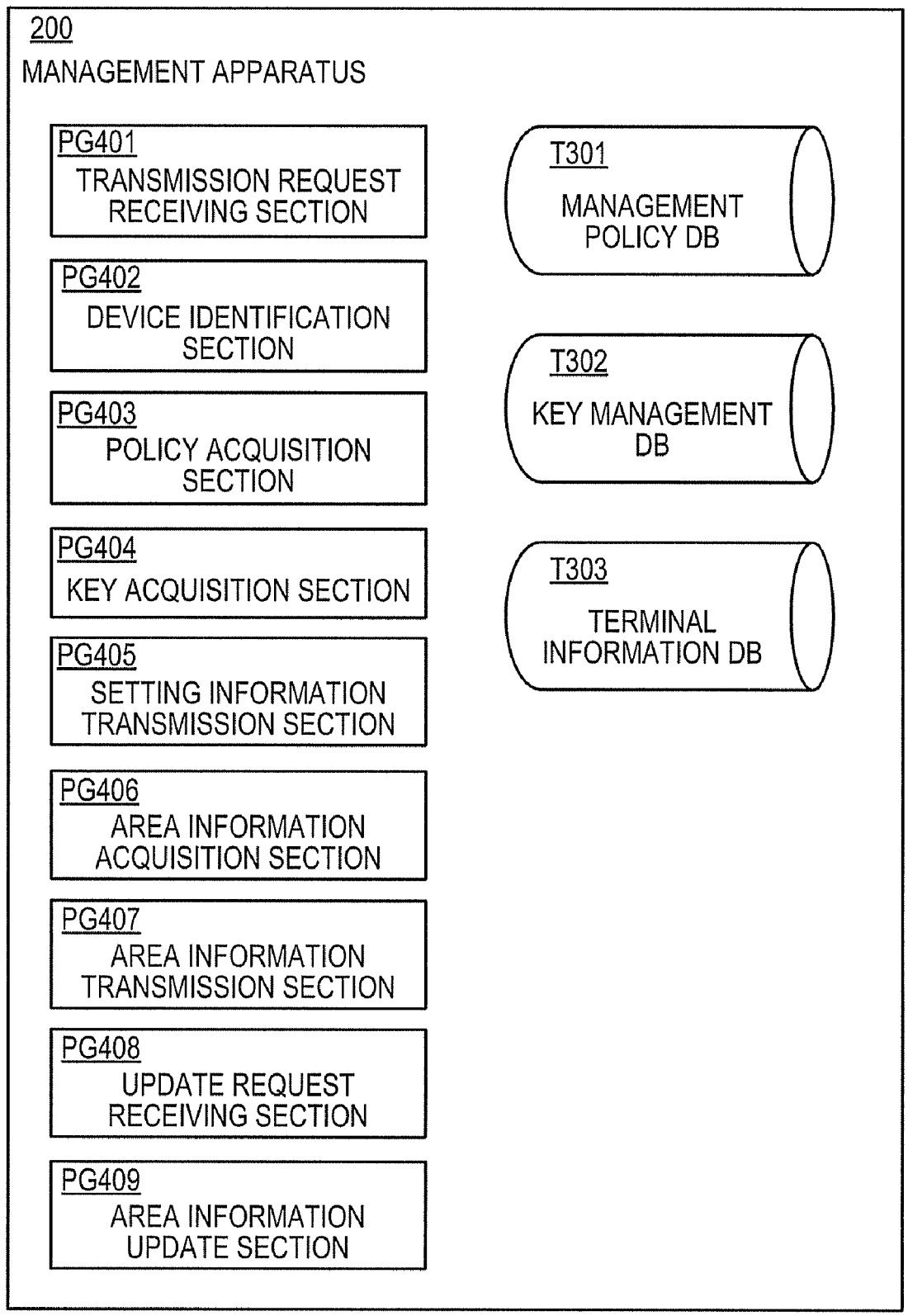
FIG. 30 is a diagram illustrating the configuration of a program to be executed by a management apparatus according to the third embodiment.

In the configuration of the program illustrated in FIG. 30, components similar to the components of the program to be executed by the management apparatus 200 according to the first embodiment (see FIG. 11) are given the same reference numerals.

The configuration of the program illustrated in FIG. 30 is different from the configuration illustrated in FIG. 11, for example, in that an update request receiving section PG408 and an area information update section PG409 are added.

Therefore, description of the similar components will be partially omitted for simplification of description.

The update request receiving section PG408 illustrated in FIG. 30 causes a CPU 210 of the management apparatus 200 to operate as a component which receives an update request transmitted from the terminal apparatus 100 using a communication section 240.

The area information update section PG409 illustrated in FIG. 30 causes the CPU 210 of the management apparatus 200 to operate as a component which updates the area information (T3012) in the management policy DB (T301) on the basis of the received update request.

The configuration of the program to be executed by the management apparatus according to third embodiment has been described.

3. Flow of Update Processing of Area Information

Figure 31:
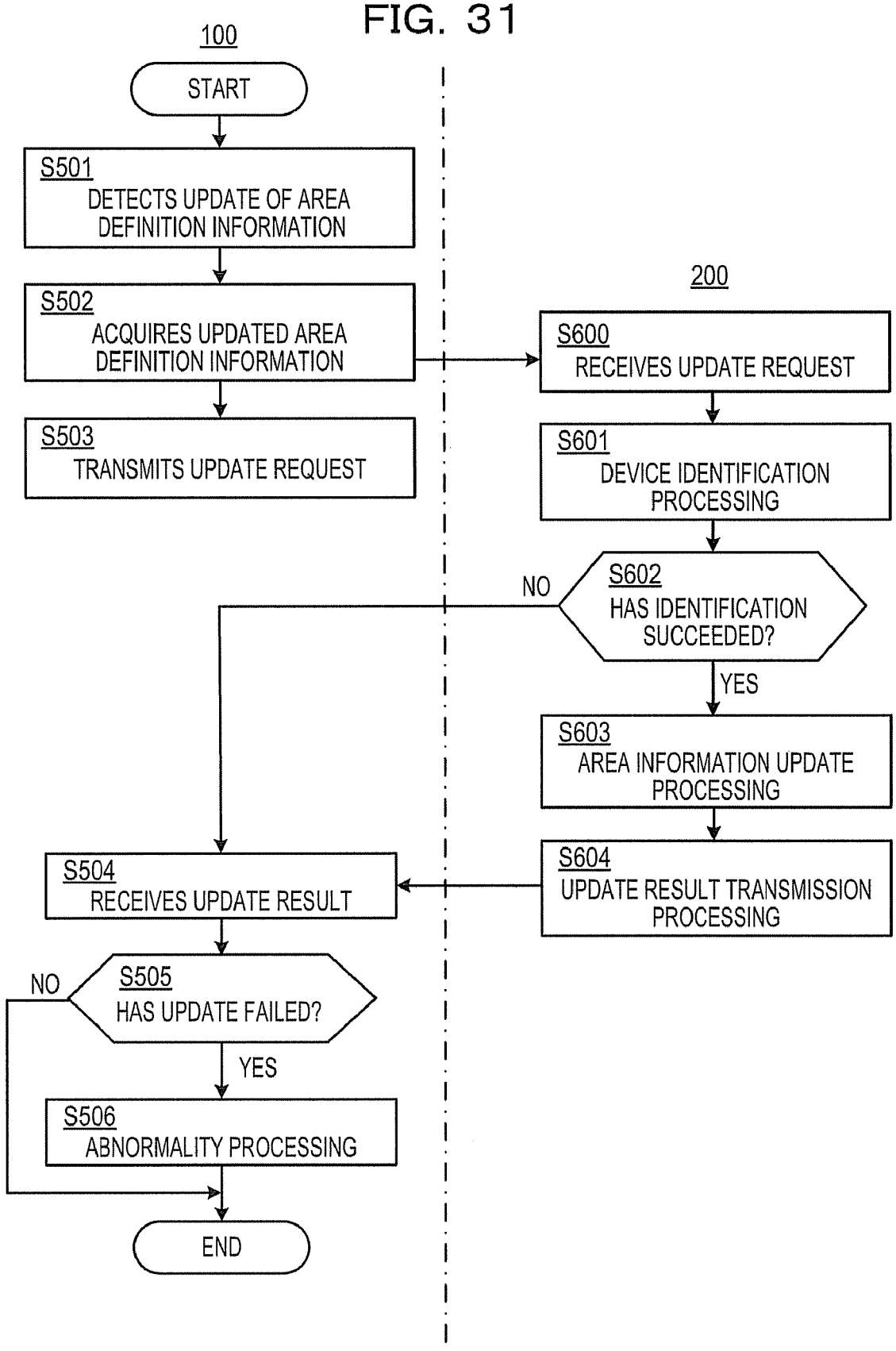
FIG. 31 is a diagram illustrating the flow of processing by the system performed when the terminal apparatus according to the third embodiment is updated.

FIG. 31 illustrates the flow of processing by a system when the terminal apparatus 100 according to the third embodiment is updated.

First, the CPU 110 which functions as the update detection section PG309 monitors that an instruction to cause an auxiliary storage section 150 to update the area definition information (T100) about the non-volatile storage medium 180 is outputted from a different program executed in the terminal apparatus 100 (S501).

If detecting update of the area definition information (T100), that is, if detecting that an instruction to cause the auxiliary storage section 150 to update the area definition information (T100) about the non-volatile storage medium 180 is outputted, the CPU 110 acquires the updated area definition information (T100) from the non-volatile storage medium 180 using the auxiliary storage section 150 (S502).

The CPU 110 transmits an update request requesting update of the area information (T3012) in the management policy DB (T301) held by the management apparatus 200 to the management apparatus 200 using the communication section 140 on the basis of the acquired area definition information (T100).

FIG. 32 illustrates the data structure of the update request.

The update request illustrated in FIG. 32 has device identification information (T2001), the number of list elements (T2002), area identification information (T2003) and an area classification (T2004).

For example, identification information about the auxiliary storage section 150 such as a manufacturer number (serial number) set for the auxiliary storage section 150, a MAC address set for the communication section 140 or information indicating the manufacturer number or the like of the terminal apparatus 100 can be used as the device identification information (T2001).

That is, any information that can classify the terminal apparatus 100 provided with the non-volatile storage medium 180 can be used as the device identification information.

For example, since information identifying the owner of the terminal apparatus 100 can classify the terminal apparatus 100 by identifying the owner, the information can be used as the device identification information.

The number of list elements (T2002) indicates the number of combination elements of the area identification information (T2003) and the area classification (T2004) included in the update request.

The area identification information (T2003) indicates information identifying the storage areas set in the non-volatile storage medium 180 held by the terminal apparatus 100.

For example, partition numbers indicating element numbers of a partition table list of the MBR (Master Boot Record) defining the storage areas of the non-volatile storage medium 180 of the terminal apparatus 100 can be used.

That is, in the example illustrated in FIG. 7, area identification information about a partition table 1 (T1802-1) is "1", area identification information about a partition table 2 (T1802-2) is "2", area identification information about a partition table 3 (T1802-3) is "3", and area identification information about a partition table 4 (T1802-4) is "4".

The area classification (T2004) indicates classification set for a storage area of the non-volatile storage medium 180 held by the terminal apparatus 100.

For example, in the example in FIG. 8, a partition type (T18023) set in a partition table of the MBR (Master Boot Record) defining the storage areas of the non-volatile storage medium 180 of the terminal apparatus 100 is used as the area classification.

Receiving an update request transmitted from the terminal apparatus 100 (S600), the management apparatus 200 performs device identification processing on the basis of the received update request (S601).

For example, the CPU 210 of the management apparatus 200 refers to a terminal information DB (T303) to judge whether or not information corresponding to the device identification information shown in the received update request is registered (S601).

The CPU 210 can also refer to a key management DB (T302) or the management policy DB (T301) to judge whether or not the information corresponding to the device identification information shown in the received update request is registered (S601).

As a result, if the corresponding information is registered, the CPU 210 can judge that identification has succeeded (S602: YES).

On the other hand, if the corresponding information is not registered, the CPU 210 can judge that identification has failed (S602: NO).

If judging that identification has succeeded (S602: YES), the CPU 210 updates the area information (T3012) in the management policy DB (T301) on the basis of the received update request (S603), and transmits the result of the update processing to the terminal apparatus 100 which has transmitted the update request using the communication section 240 (S604).

In the processing S603 described above, the CPU 210 acquires area information (T3012) corresponding to the area identification information (T2003) shown in the received update request from the management policy DB (T301).

In the processing S603 described above, the CPU 210 updates area classification (T3014) in the acquired area information (T3012) with the value of the area classification (T2004) shown in the received update request.

In the processing S603 described above, the CPU 210 updates the area information (T3012) in the management policy DB (T301) on the basis of the received update request, by reregistering the updated area information (T3012) with the management policy DB (T301).

On the other hand, if judging that identification has failed (S602: NO), the CPU 210 transmits information to the effect that identification has failed, to the terminal apparatus 100 which has transmitted the update request using the communication section 240.

Receiving the update result transmitted from the management apparatus 200 (S504), the terminal apparatus 100 judges whether the update processing has failed or not (S505). If the received update result indicates that the update processing has failed (S505: YES), the terminal apparatus 100 executes given abnormality processing (S506).

The flow of the update processing in the third embodiment has been described.

Fourth Embodiment

1. Configuration of Program to be Executed by Terminal Apparatus According to Fourth Embodiment This embodiment is an embodiment in the case where a management policy DB (T301) is arranged in a terminal apparatus 100.

Figure 33:
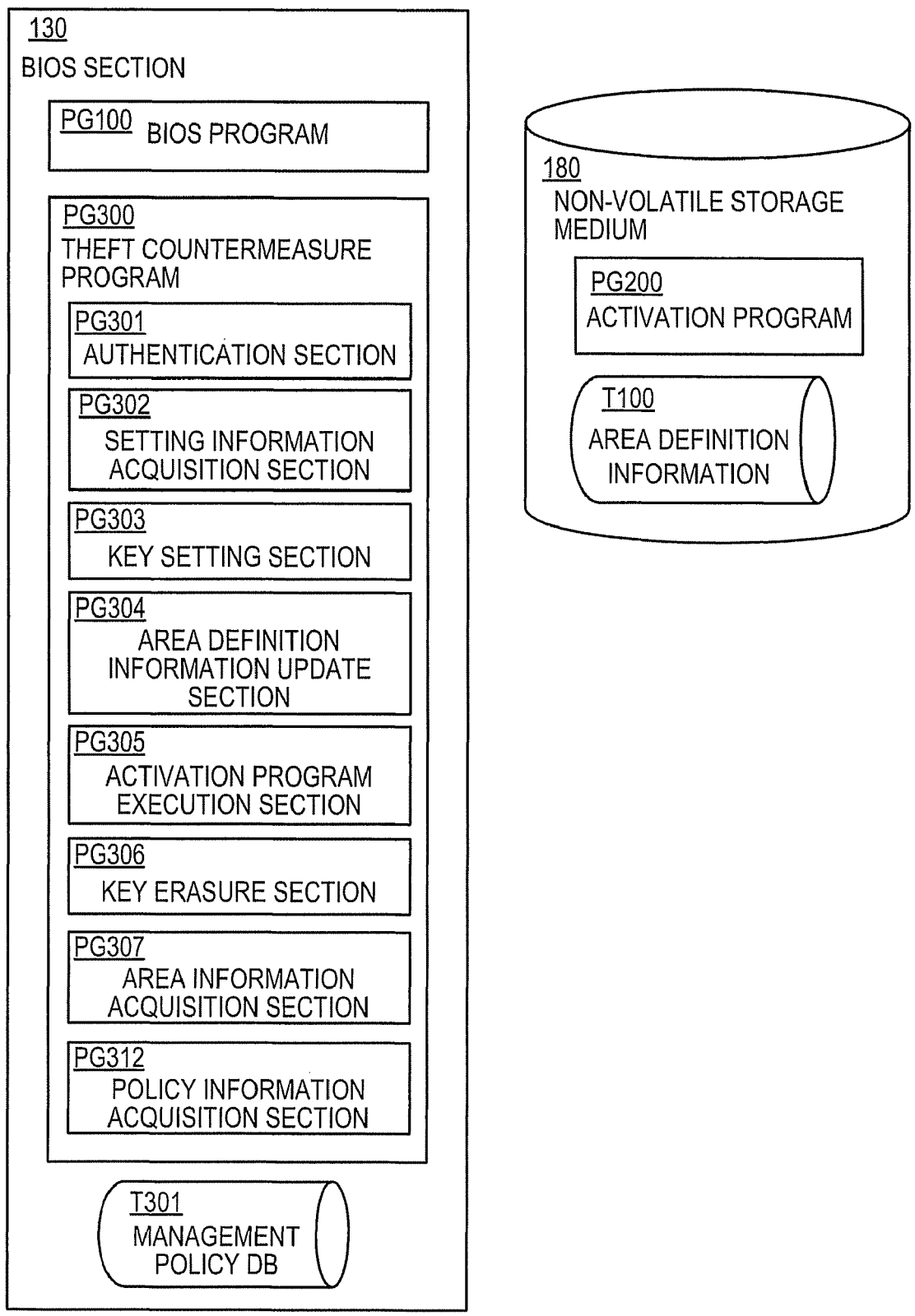
FIG. 33 is a diagram illustrating the configuration of a program to be executed by a terminal apparatus according to a fourth embodiment.

FIG. 33 illustrates an example of the configuration and storage place of a program to be executed by the terminal apparatus 100 according to the fourth embodiment.

In the configuration of the program illustrated in FIG. 33, components similar to the components of the program to be executed by the terminal apparatus 100 according to the first embodiment (see FIG. 3) are given the same reference numerals.

The configuration of the program illustrated in FIG. 33 is different from the configuration illustrated in FIG. 3 in that a policy information acquisition section PG312 and a management policy DB (T301) are held.

Therefore, description of the similar components will be partially omitted for simplification of description.

The policy information acquisition section PG312 illustrated in FIG. 33 causes a CPU 110 to operate as a component which acquires policy information from the management policy DB (T301) according to this embodiment, on the basis of setting information acquired from a management apparatus 200.

FIG. 34 illustrates an example of the data structure and contents of the management policy DB (T301) according to this embodiment.

The management policy DB (T301) illustrated in FIG. 34 has area information (T3012) and definition information (T3015).

The area information (T3012) illustrated in FIG. 34 has area identification information (T3013) and an area classification (T3014).

The definition information (T3015) illustrated in FIG. 34 has definition classification (T3016) and drive display (T3017).

Since the definitions of the information described above are similar to those in the first embodiment, description thereof will be omitted.

2. Configuration of Program to be Executed by Management Apparatus According to Fourth Embodiment FIG. 35 illustrates the configuration of a program to be executed by a management apparatus 200 according to the fourth embodiment.

Figure 35:
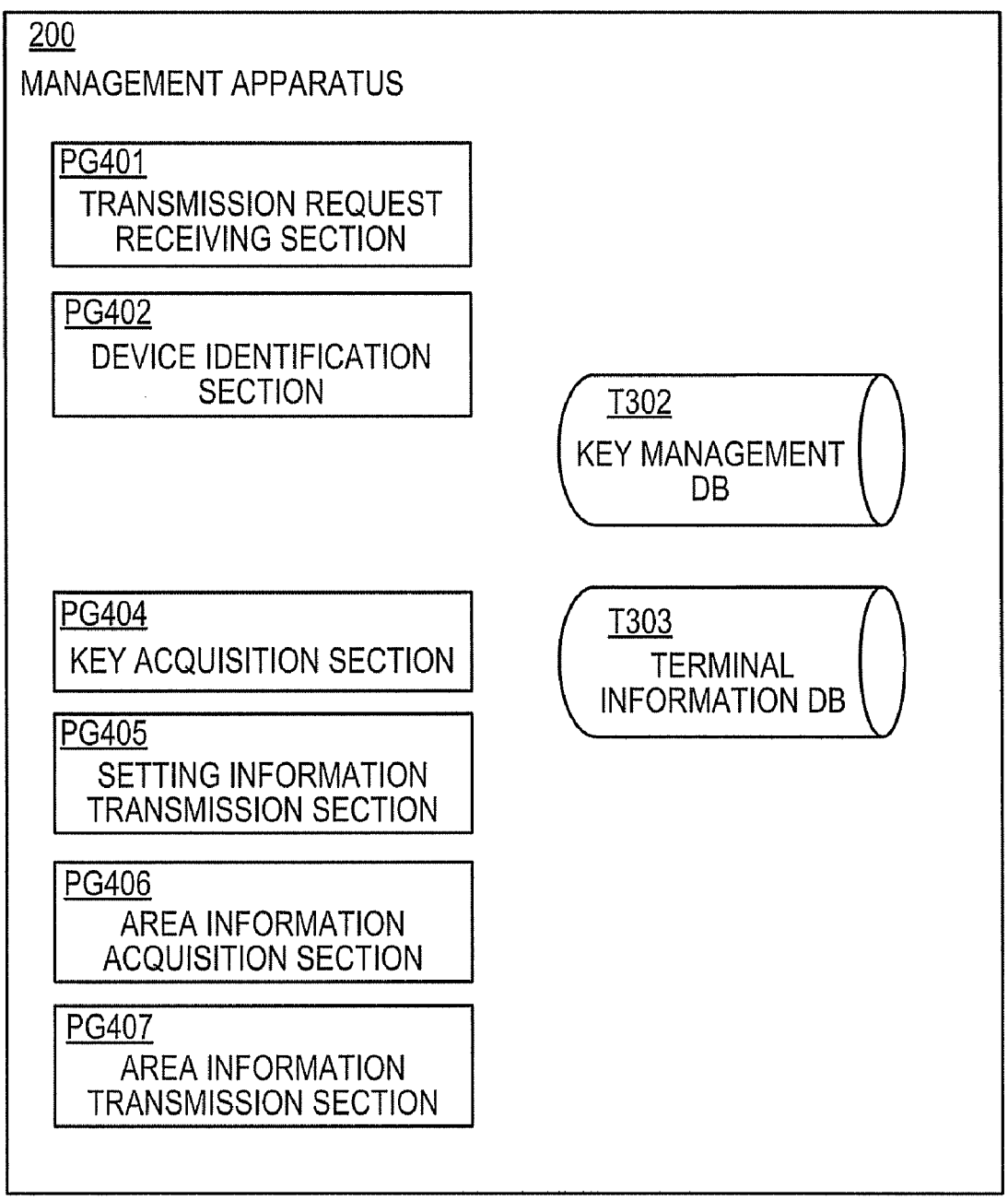
FIG. 35 is a diagram illustrating the configuration of a program to be executed by a management apparatus according to the fourth embodiment.

In the configuration of the program illustrated in FIG. 35, components similar to the components of the program to be executed by the management apparatus 200 according to the first embodiment (see FIG. 11) are given the same reference numerals.

The configuration of the program illustrated in FIG. 35 is different from the configuration illustrated in FIG. 11, for example, in that a policy acquisition section PG403 is not held.

The data structure of setting information transmitted by a setting information transmission section PG405 which is executed by the management apparatus 200 according to the fourth embodiment is different from the first embodiment, for example, in that state information is held.

Therefore, description of the similar components will be partially omitted for simplification of description.

The setting information transmission section PG405 illustrated in FIG. 35 causes a CPU 210 to operate as a component which transmits setting information generated with the use of state information (T3032) acquired from a terminal information DB (T303) to a terminal apparatus 100 which has transmitted a transmission request using a communication section 240.

Figure 36:
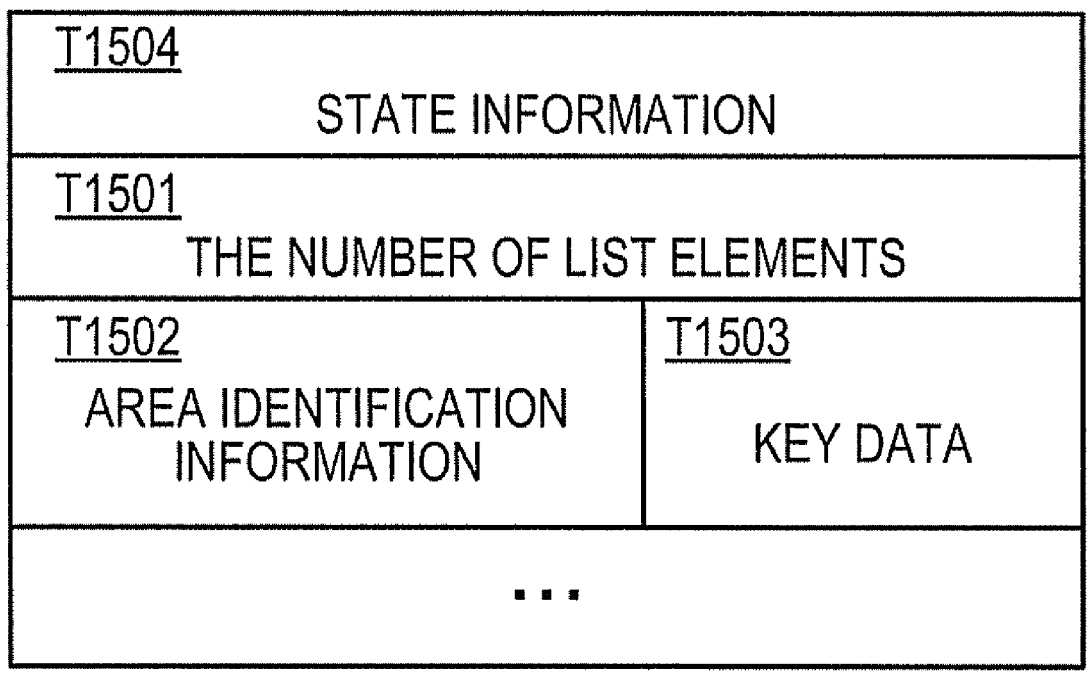
FIG. 36 is a diagram illustrating the data structure of setting information according to the fourth embodiment.

FIG. 36 illustrates the data structure of the setting information transmitted by the management apparatus 200 according to the fourth embodiment.

The data structure of the setting information illustrated in FIG. 36 has combinations of state information (T1504), the number of list elements (T1501), area identification information (T1502) corresponding to the number shown in the number of list elements (T1501) and key data (T1503).

3. Flow of Processing at the Time of Activation According to Fourth Embodiment FIG. 37 illustrates the flow of processing by a system performed when the terminal apparatus 100 according to the fourth embodiment is activated.

Figure 37:
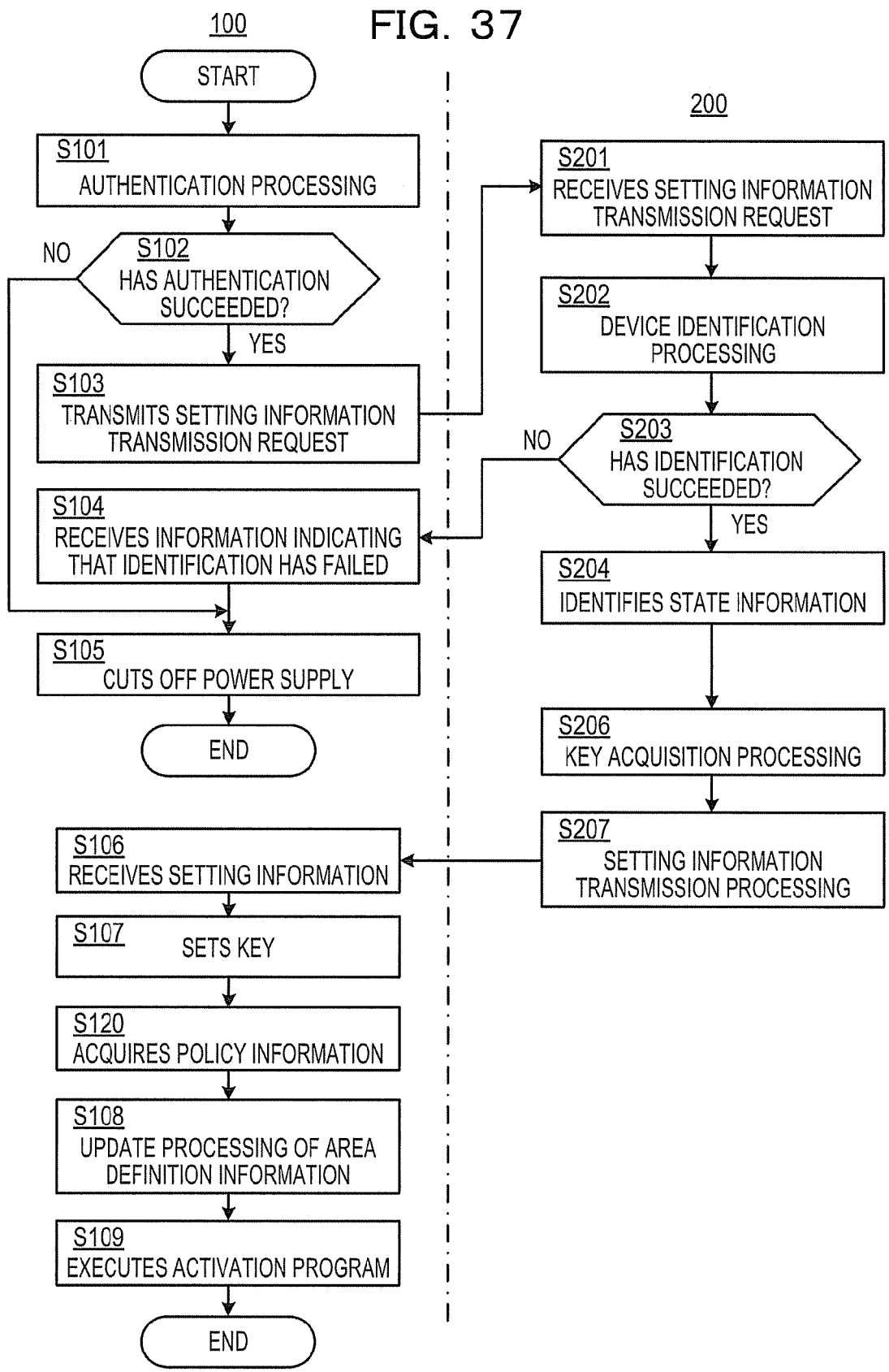
FIG. 37 is a diagram illustrating the flow of processing by a system performed when the terminal apparatus according to the fourth embodiment is activated.

In the processing procedure illustrated in FIG. 37, contents similar to the contents of the flow of the processing by the system performed when the terminal apparatus 100 is activated, according to the first embodiment (see FIG. 18) are given the same reference numerals.

The processing procedure illustrated in FIG. 37 is different from the flow of the processing illustrated in FIG. 18, for example, in that processing S120 is added.

Therefore, description of the similar contents will be partially omitted for simplification of description.

First, the management apparatus 200 receives the setting information transmission request transmitted from the terminal apparatus 100 connected via a communication network 300 (S201) and performs device identification processing on the basis of the received transmission request (S202).

For example, the CPU 210 of the management apparatus 200 refers to the terminal information DB (T303) to judge whether or not information corresponding to the device identification information shown in the received transmission request is registered (S202).

The CPU 210 can also refer to a key management DB (T302) to judge whether or not the information corresponding to the device identification information shown in the received transmission request is registered (S202).

As a result, if the corresponding information is registered, the CPU 210 can judge that identification has succeeded (S203: YES).

On the other hand, if the corresponding information is not registered, the CPU 210 can judge that identification has failed (S203: NO).

If the medium identification information is included in the transmission request together with the device identification information and transmitted at the processing S103 described above, the CPU 210 can judge whether or not identification has succeeded by judging whether or not information corresponding to the combination of the device identification information and the medium identification information included in the transmission request received at the processing S201 described above is registered with the various DB's described above.

Thereby, even when one of the device identification information and the medium identification information corresponds, identification in the device identification processing described above can be caused to fail.

For example, when it is attempted to incorporate a non-volatile storage medium 180 which has already been registered with the management apparatus 200 into a terminal apparatus 100 which is not registered with the management apparatus 200 and use it, it is possible to cause identification in the identification processing (S202) described above to fail.

If judging that identification has succeeded (S203: YES), the CPU 210 refers to the terminal information DB (T303) to identify state information set for the terminal apparatus 100 which has transmitted the transmission request (S204).

Next, the CPU 210 of the management apparatus 200 acquires a combination of area identification information (T3022) and key data (T3023) corresponding to the device identification information shown in the received transmission request, from the key management DB (T302) (S206).

The CPU 210 generates setting information having the acquired combination of the area identification information (T3022) and the key data (T3023) and the state information identified at the processing S204 described above, and transmits the setting information to the terminal apparatus 100 which has transmitted the setting information transmission request, using the communication section 240 (S207).

FIG. 36 illustrates the data structure of the setting information transmitted at S207 described above.

The setting information illustrated in FIG. 36 has combinations of the state information (T1504), the number of list elements (T1501), the area identification information (T1502) corresponding to the number shown in the number of list elements (T1501) and the key data (T1503).

The CPU 210 of the management apparatus 200 may omit the combinations of the number of list elements (T1501), the area identification information (T1502) and the key data (T1503) among the elements of the setting information transmitted at the processing S207 described above.

For example, when encryption and decryption processing of information to be stored into the non-volatile storage medium 180 is not performed or key data used for encryption and decryption processing is acquired from a source other than the setting information, in the terminal apparatus 100, the CPU 210 of the management apparatus 200 can omit the key data and the like among the elements of the setting information transmitted at the processing S207 described above.

In this case, the key data acquisition processing at the processing S206 described above may be omitted.

The terminal apparatus 100 receives the setting information transmitted from the management apparatus 200 connected via the communication network 300 (S106) and performs various setting processes (S107 and S108).

For example, if key data is included in the setting information, the CPU 110 of the terminal apparatus 100 sets the key data included in the received setting information, in an auxiliary storage section 150 (S107).

For example, the key data is stored into a storage section provided within the auxiliary storage section 150 separately from the non-volatile storage medium 180.

The CPU 110 acquires policy information from the management policy DB (T301) on the basis of the state information (T1504) shown in the received setting information (S120).

That is, the CPU 110 identifies definition information in which the definition classification (T3016) corresponding to the state information shown in the received setting information is set.

For example, if the state information (T1504) shown in the received setting information is "restricted", definition information in which the definition classification (T3016) is "restricted" is identified.

Furthermore the CPU 110 acquires the identified definition information (T3015) in association with the area information (T3012) corresponding to the storage areas held by the non-volatile storage medium 180 to generate policy information (S120).

Here, the area information (T3012) corresponding to the storage areas held by the non-volatile storage medium 180 can be identified by referring to area definition information (T100) about the non-volatile storage medium 180.

Description will be made using the implementation example of the area definition information illustrated in FIG. 7.

The CPU 110 acquires a partition number indicating the position of a partition table in a partition list (T1802) illustrated in FIG. 7 as the area identification information.

The CPU 110 can identify the area information (T3012) by checking the area identification information acquired by referring to the area definition information (T100) against the area identification information (T3013) registered with the management policy DB (T301).

The CPU 110 updates area classification (T1002) in the area definition information (T100) stored into the main storage section 120, on the basis of the acquired policy information.

The CPU 110 writes the updated area definition information (T100) into the non-volatile storage medium 180 using the auxiliary storage section 150.

Thereby, the CPU 110 updates the area definition information (T100) stored in the non-volatile storage medium 180 on the basis of the policy information acquired with the use of the state information shown in the setting information received from the management apparatus 200.

Since the details of the update processing are similar to those in the first embodiment, description thereof will be omitted.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A terminal apparatus capable of accessing a non-volatile storage medium using an operating system, the terminal apparatus comprising:
   a memory and a processor;
   a setting information acquisition section running on the processor which acquires setting information for controlling whether a storage area held by the non-volatile storage medium is to be used or not, from an external apparatus connected via a network when the terminal apparatus is activated;
   an area definition information update section which, if the acquired setting information indicates that the use of the storage area is restricted, updates area definition information defining a structure of storage areas in the non-volatile storage medium so that the storage area the use of which is restricted is in a state which cannot be recognized by the operating system; and
   an activation section which, if the acquired setting information indicates that the use of the storage area is restricted, performs activation processing of the operating system after the update of the area definition information ends.

2. The terminal apparatus according to claim 1, further comprising:
a data erasure section which, if the acquired setting information indicates that the use of the storage area is restricted, executes processing for erasing data stored in the storage area shown in the acquired setting information from the non-volatile storage medium after the update processing of the area definition information ends.

3. The terminal apparatus according to claim 2, wherein
if the acquired setting information includes an instruction to delete the data, the area definition information update section stores address information indicating the position of the storage area the use of which is restricted on the basis of the acquired setting information into a given storage area held by the terminal apparatus; and
the data erasure section acquires the address information from the given storage area and erases the data from the storage area in the non-volatile storage medium on the basis of the address information.

4. The terminal apparatus according to claim 1, further comprising:
an update detection section which detects the update processing of the area definition information after the activation processing by the activation section is executed;
an area definition acquisition section which, if execution of the update processing is detected, acquires the updated area definition information; and
an update request transmission section which transmits information about the data structure of the storage area shown in the acquired area definition information to an external apparatus connected via the network.

5. The terminal apparatus according to claim 1, wherein
when an operation state of the terminal apparatus is changed after the activation processing by the activation section is executed, the area definition information update section restores area definition information updated at the time of activation to contents before the update.

6. The terminal apparatus according to claim 5, wherein
the area definition information update section stores contents of the area definition information before the update into a given storage area held by the terminal apparatus, in the update processing at the time of activation; and
the area definition information update section restores area definition information on the basis of the contents of the area definition information before the update which has been stored into the given storage area, in the restoration processing at the time of changing the operation state.

7. A computer program product stored on a tangible computer readable medium for a computer capable of accessing a non-volatile storage medium using an operating system, the computer program product comprising computer executable instructions that cause a computer to execute:
acquiring setting information for controlling whether a storage area held by the non-volatile storage medium is to be used or not, from an external apparatus connected via a network when a terminal apparatus is activated;
if contents of the acquired setting information indicate that the use of the storage area is restricted, updating area definition information defining a structure of storage areas in the non-volatile storage medium so that the storage area the use of which is restricted is in a state which cannot be recognized by the operating system; and
if the contents of the acquired setting information indicate that the use of the storage area is restricted, performing activation processing of the operating system after the update of the area definition information ends.

8. A method of accessing a non-volatile storage medium using an operating system, the method comprising:
connecting an external apparatus to a terminal apparatus via a network;
activating the terminal apparatus;
acquiring setting information for controlling whether a storage area held by the non-volatile storage medium is to be used or not from the external apparatus when the terminal apparatus is activated;
controlling whether the storage area held by the non-volatile storage medium is to be used or not with the setting information;
defining a structure of the storage area in the non-volatile storage medium so that the storage area is in a state which cannot be recognized by the operating system;
updating area definition information if contents of the acquired setting information indicate that the use of the storage area is restricted; and
performing activation of the operating system after the update processing of the area definition information ends if the contents of the acquired setting information indicate that the use of the storage area is restricted.

* * * * *